US011991276B2

(12) United States Patent
Pilozzi

(10) Patent No.: US 11,991,276 B2
(45) Date of Patent: *May 21, 2024

(54) METHOD AND APPARATUS FOR CRYPTOGRAPHICALLY ALIGNING AND BINDING A SECURE ELEMENT WITH A HOST DEVICE

(71) Applicant: STMicroelectronics, Inc., Coppell, TX (US)

(72) Inventor: Giuseppe Pilozzi, North Attleboro, MA (US)

(73) Assignee: STMICROELECTRONICS, INC., Coppell, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/939,385

(22) Filed: Sep. 7, 2022

(65) Prior Publication Data

US 2023/0006823 A1 Jan. 5, 2023

Related U.S. Application Data

(63) Continuation of application No. 16/425,118, filed on May 29, 2019, now Pat. No. 11,444,759.

(51) Int. Cl.
*H04L 9/08* (2006.01)
*G06F 8/61* (2018.01)
(Continued)

(52) U.S. Cl.
CPC ............. *H04L 9/0866* (2013.01); *G06F 8/61* (2013.01); *G06F 11/1451* (2013.01);
(Continued)

(58) Field of Classification Search
CPC ....... H04L 9/0866; H04L 9/0894; H04L 9/14; H04L 9/30; H04L 9/3226; G06F 8/61; G06F 11/1451
(Continued)

(56) References Cited

U.S. PATENT DOCUMENTS

2006/0059094 A1 3/2006 Oh et al.
2007/0276925 A1* 11/2007 La Joie ................ H04N 21/835
709/219
(Continued)

FOREIGN PATENT DOCUMENTS

CN 101014944 A 8/2007
CN 101682501 A 3/2010
(Continued)

OTHER PUBLICATIONS

Extended European Search Report, EP Application No. 20176898.3, dated Oct. 26, 2020, 8 pages.

*Primary Examiner* — Teshome Hailu
(74) *Attorney, Agent, or Firm* — Slater Matsil, LLP

(57) ABSTRACT

A secure element device that is configured to be cryptographically bound to a host device includes a secure element host key slot configured to store host key information that allows only the host device to control the secure element, a secure memory storing binding information, and limited functionality allowing the binding information to be read from the secure memory by the host device during a binding process. The binding information is cryptographically correlated with the host key information. The host key information is generated by the host device using the binding information read from the secure element and a secret key.

(Continued)

The secure element device further includes general functionality only accessible to the host device using the host key information that is generated by the host device. The secure memory includes prevention measures impeding unauthorized entities from obtaining information from the secure memory.

20 Claims, 10 Drawing Sheets

(51) Int. Cl.
    *G06F 11/14*      (2006.01)
    *H04L 9/14*      (2006.01)
    *H04L 9/30*      (2006.01)
    *H04L 9/32*      (2006.01)

(52) U.S. Cl.
    CPC .............. *H04L 9/0894* (2013.01); *H04L 9/14* (2013.01); *H04L 9/30* (2013.01); *H04L 9/3226* (2013.01); *G06F 2201/84* (2013.01)

(58) Field of Classification Search
    USPC .......................................................... 380/44
    See application file for complete search history.

(56) References Cited

U.S. PATENT DOCUMENTS

| | | | |
|---|---|---|---|
| 2008/0209221 A1* | 8/2008 | Vennelakanti | H04L 9/0891 |
| | | | 713/183 |
| 2008/0294894 A1 | 11/2008 | Dubhashi et al. | |
| 2009/0070884 A1* | 3/2009 | Wu | G06F 21/34 |
| | | | 726/27 |
| 2015/0348022 A1* | 12/2015 | Khan | G06Q 20/385 |
| | | | 705/44 |
| 2016/0065370 A1 | 3/2016 | Le Saint et al. | |
| 2017/0026355 A1* | 1/2017 | Mathaiyan | H04L 63/0428 |
| 2017/0041349 A1* | 2/2017 | Ylonen | H04L 9/321 |
| 2019/0123914 A1 | 4/2019 | Wei | |

FOREIGN PATENT DOCUMENTS

| | | |
|---|---|---|
| CN | 103077359 A | 5/2013 |
| CN | 104253692 A | 12/2014 |
| CN | 106797311 A | 5/2017 |
| CN | 107612697 A | 1/2018 |
| EP | 3293980 A1 | 3/2018 |
| WO | 2018189539 A1 | 10/2018 |

\* cited by examiner

METHOD AND APPARATUS FOR CRYPTOGRAPHICALLY ALIGNING AND BINDING A SECURE ELEMENT WITH A HOST DEVICE

CROSS-REFERENCE TO RELATED APPLICATIONS

This application is a continuation of U.S. application Ser. No. 16/425,118, filed on May 29, 2019, which application is hereby incorporated herein by reference in its entirety.

TECHNICAL FIELD

The present invention relates generally to cryptographic alignment, and, in particular embodiments, to methods and apparatuses for cryptographically aligning a secure element with a host device.

BACKGROUND

Device security is important to protect the contents of data as well as guarantee the identity of devices generating the data. A secure element can be used to store and apply sensitive data such as cryptographic keys and securely execute computer code such as electronic payment applications for a host device, or cryptographically support transport layer security (TLS) for internet of things (IoT) devices. The secure element includes active and/or passive prevention measures render it infeasible for unauthorized entities to read the contents in memory of the secure element or discover crypto secrets stored in the secure element. The secure element is cryptographically bound to the host device using host key information known only to the secure element and the host device.

Among other uses, the secure element can be used as the basis of the identity of the host device. In order to guarantee the identity of the host device, it is important that the host key information is not discovered by an external entity. The host key information may be stored in the secure element and then subsequently sent to the host device during a binding process. However, the secure element and the host device may be manufactured at separate locations and/or by different manufacturers. As a result, the binding process may be performed at an insecure location. For example, the host key information may be vulnerable to discovery during the binding process when the host key information is transmitted from the secure element to the host device, or when the host device sends the command to personalize the secure element with the host keys. Therefore, binding processes between a secure element and a host device which reduce or eliminate the possibility of an external entity discovering host key information may be desirable.

SUMMARY

In accordance with an embodiment of the invention, a method of cryptographically binding a secure element to a host device includes storing host key information in a secure element host key information slot of the secure element and storing binding information in secure memory of the secure element at a first location. The binding information is cryptographically correlated with the host key information. The method also includes storing a second secret key within system operational code stored in protected memory of the host device at a second location remote to the first location. The second secret key is cryptographically correlated with the host key information. The method further includes, at a third location after storing the binding information and after storing the second secret key $SK_2$, operationally coupling the secure element to the host device, reading, by the host device, the binding information from the secure element, generating, by the host device, the host key information using the binding information and the second secret key, and storing, by the host device, the host key information in a host device host key information slot of the host device. The secure element and the host device are collocated at the third location. The third location is remote to both the first location and the second location.

In accordance with another embodiment, a method of cryptographically aligning a secure element with a host device includes generating a secure element-diversified key as a function of a master key and a secure element unique identifier and encrypting host key information using the secure element-diversified key to generate encrypted host key information. The host key information $HK_{SE}$ uniquely corresponds to the secure element. The method also includes storing the host key information in a secure element host key information slot of the secure element, storing the encrypted host key information in secure memory of the secure element, and obfuscating the master key using a host device unique identifier to generate a host device-obfuscated key within system operational code stored in protected memory of the host device.

In accordance with still another embodiment of the invention, a method of cryptographically binding a secure element to a host device includes storing a secure element private key in secure memory of the secure element, creating a secure element public key using the secure element private key, storing a host device private key within system operational code stored in protected memory of the host device, and operationally coupling the secure element and the host device. The method further includes executing the system operational code by the host device. Executing the system operational code includes reading the secure element public key from the secure element, creating host key information using the host device private key and the secure element public key, and storing the host key information in a host device host key information slot of the host device.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
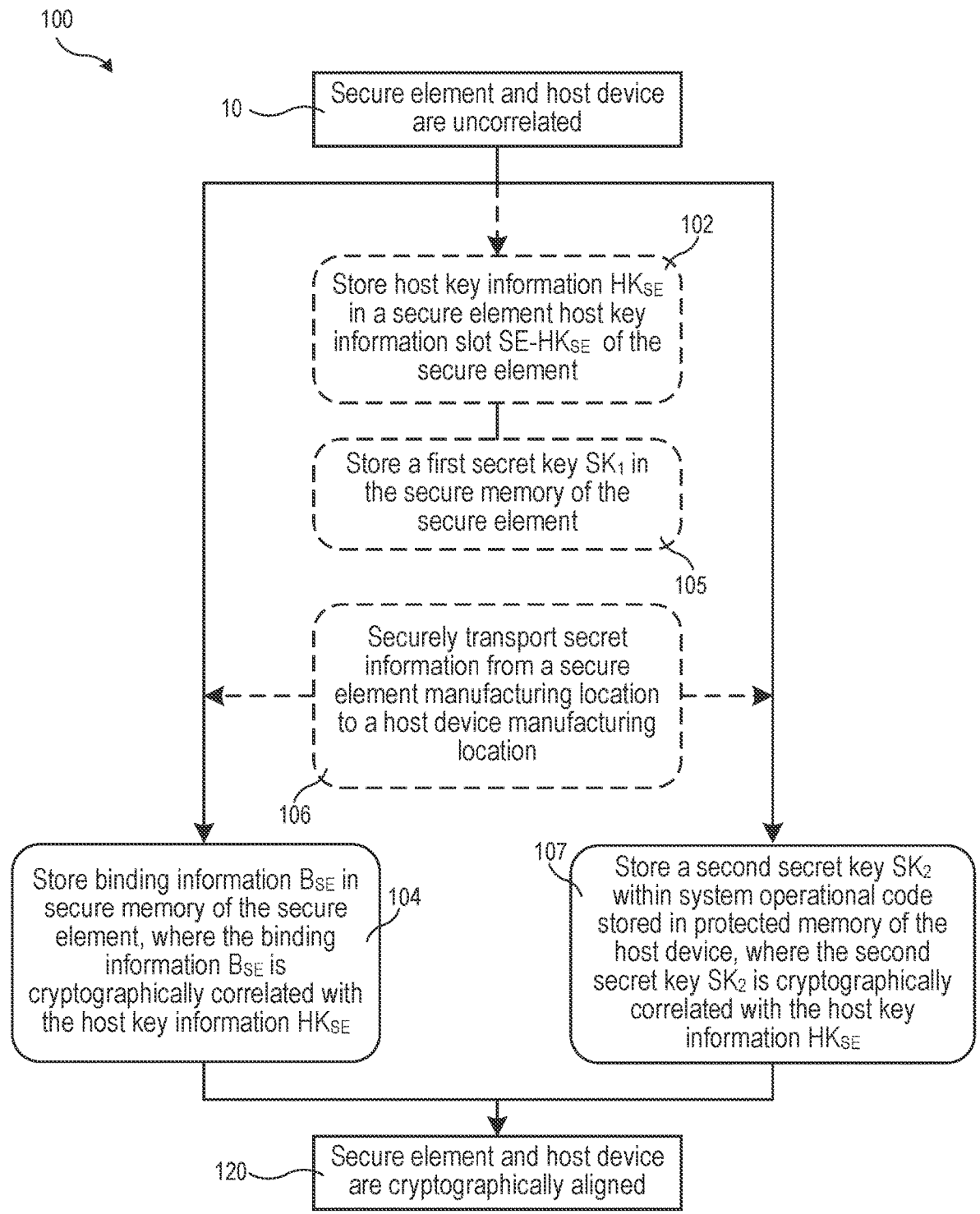
FIG. 1 illustrates a method of cryptographically aligning a secure element with a host device in accordance with an embodiment of the invention.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Secure elements include security features which enable secure storage of sensitive data as well as secure processing within the secure element for a paired host device. A secure element can be a microcontroller (MCU) or a microprocessor (MPU) that includes security features. A specific example of a secure element is the STSAFE family of secure microcontrollers including the STSAFE-A100, for example. A host device may be a computing device such as an MCU or an MPU. A specific example of a host device is the STM32 family of microcontrollers.

A host device may be considered paired with a secure element when the host device is cryptographically bound to the secure element using host key information known only to the secure element and the host device. The host device may have reduced security capabilities or no security capabilities. That is, a host device in the context of the present disclosure may be any device that can be cryptographically bound to a secure element in order to derive benefit from the additional security features afforded by the secure element.

Host key information may include one or more cryptographic keys. In various embodiments, the host key information includes one or more symmetric keys. For example, the host key information may include a private key created at a secure fabrication location. The host key information may include a message authentication code (MAC) key so that the secure element can verify that a received command is sent from the host device and vice versa. The host key information may also include an encryption key that can be used by the secure element and the host device to encrypt and decrypt information that is transferred between the secure element and the host device (e.g. on an electrical bus).

Although the above examples utilize symmetric keys, the host key information is not limited to symmetric encryption schemes. For example, a public key (e.g. a certificate) may be created using a signed key that is also secure. For example, the private key and public key may be created and certified using a hardware security module (HSM). The host key information may enable secure communication between the host device and the secure element.

Prior to the pairing of the secure element and the host device, security critical functionality of the secure element is unavailable to the host device. That is, it is not possible for the host device to send certain commands to the secure element and for the secure element to execute the command without the host device having the host key information. Therefore, data stored on the secure element which solution users may want to protect cannot be read and interpreted for any reason by the host device without the host key information. Once the host device is operatively coupled to the secure element, the pairing process begins or is initiated using a predetermined process and runs to completion resulting in the host key information being securely stored on the host device. Once the secure element and the host device are cryptographically bound, the host device is able to send commands to the secure element to obtain data stored on the secure element in addition to other secure functionality.

Secure elements may be used as the basis of identity for host devices such as IoT devices. For example, with the ubiquity of connected devices, IoT devices may be used in applications requiring credentials or in operating valuable services (e.g. devices that are susceptible to fraud or counterfeiting, USB T e-C devices, accessories for electronic devices such as phones or gaming devices, consumables such as printer cartridges, and the like). IoT devices can also include thermostats, doorbell cameras, and security devices which may be enabled with customer Wi-Fi credentials and could be used to compromise end customer security should a device be compromised during or after the device's manufacture. Using a secure element, it is infeasible to discover and create a clone of authentication information such as a private key.

The infeasibility of compromising the private key of the host device may advantageously guarantee the identity of the host device. In many applications guaranteeing the identity of the host device may be important such as when the host device has control over critical systems and/or access to sensitive information. Secure elements may also provide security for other types of host devices such as servers, personal computers, laptop computers, tablet computers, cellular phones, routers, switches, base stations, access points, data concentrators, gateways, medical devices, automotive equipment, and others.

Since secure elements fill a specific role of providing security for a host device, it may be possible for all secure elements to be manufactured at secure locations with access to an HSM to provide a certificate basis for host key information. However, it may be difficult or impossible to provide host devices with the same security during fabrication due to the many different applications of the host devices and various fabrication locations. For example, billions of general purpose microcontrollers may be shipped in a year from multiple fabrication facilities to numerous costumers destined for various applications and chipset environments. Some of the general purpose microcontrollers may become host devices paired with a secure element while others may not require any additional security. Further, a secure element may be paired with a host device that is not manufactured by the same manufacturer as the secure element. Consequently, using conventional methods, there may be no easy way to initialize host key information with a certificate basis for each host device for specific customers for end-customer use.

In order to maintain effectiveness of the secure element, host devices that use a secure element should be paired with the secure element in such a way as to only allow the host device to control the secure element. This may be achieved by using host key information known only to the secure element and the host device. For example, the host key information may be installed in secure memory locations in both the secure element and the host device. However, when the secure element and the host device are brought together to be cryptographically bound, it is not uncommon for only the secure element to have the host key information and for the manufacturing location to lack the security required to guarantee the secrecy of the host key information. That is, the manufacturing location may not be trusted and the host key information may be compromised while being transferred from the secure element to the host device.

During conventional pairing processes, a secure element may send a random number to chipset initialization equipment which gets installed in an appropriate location in the host device so as to function as host key information, and commands the secure element to be the host key (one time process). However, in these conventional pairing processes, secrecy of the random number is only guaranteed if the chipset manufacturing location is secure since the random number is sent in the clear between the secure element and the host device. Therefore, a pairing process to cryptographically bind a secure element to a host device that does not send the raw host key information from the secure element to the host device may be desirable.

Various embodiments described herein provide methods and apparatuses that cryptographically align a secure element with a host device prior to a cryptographic binding process. The disclosed embodiments store binding information in the secure element and store a secret key in the host device. The binding information is cryptographically correlated with the secret key. During the binding process, host key information can be generated by the host device using the binding information and the secret key. Through these techniques, the disclosed embodiments may provide various advantages including secrecy of host key information during a binding process between a secure element and a host device. Additional implementations and advantages may be apparent to one of ordinary skill in the art in view of the following description.

In particular, there is a cryptographic correlation between information stored in the secure element and information stored the host device during initialization in trusted manufacturing facilities so that subsequently the secure element and the host device may advantageously be securely paired in a potentially insecure environment. Further, the cryptographic alignment of the secure element and the host device prior to being brought together beneficially obscures the binding process using encryption so that it is infeasible or impossible for a contract manufacturer or parties on the manufacturer's line to observe the host key information during the binding process because the host key information itself is not transmitted in the clear between the secure element and the host device. Another possible advantage is that no HSM is needed at the chipset manufacturing location. For example, an HSM may not be necessary on the manufacturing line of a customer or the manufacturing line of a subcontractor of a customer when cryptographically binding a secure element and a host device which may beneficially reduce costs. Further, once a secure element and a host device are securely bound using the processes herein, additional keys stored in the secure element may be used advantageously as the secure basis to personalize the host device without the need for an HSM. For example, the secure element may be used as a hardware license to allow only the host device or limited number of host devices to access additional proprietary information.

Embodiments provided below describe various methods and apparatuses for cryptographically aligning a secure element with a host device, and in particular, methods and apparatuses that store binding information in a secure element and storing a secret key in the host device, the binding information being cryptographically correlated to the secret key. The following description describes the embodiments. An embodiment method of cryptographically aligning a secure element with a host device is described using FIG. 1. An embodiment method of cryptographically binding a secure element to a host device is described using FIG. 2. An embodiment method of securely acquiring proprietary information by a host device cryptographically bound to a secure element is described using FIG. 3. Embodiment schematic block diagrams of a secure element, host device, and hardware security modules usable for cryptographic alignment, binding, and secure acquisition of proprietary information are described using FIG. 4. Two more embodiment methods of cryptographically aligning a secure element with a host device are described using FIGS. 5 and 8. FIGS. 6 and 9 are used to describe another two embodiment methods of cryptographically binding a secure element to a host device. Additional embodiment schematic block diagrams secure elements, host devices, and hardware security modules usable for cryptographic alignment, binding, and secure acquisition of proprietary information are described using FIGS. 7 and 10.

The method steps described herein may be performed in any suitable order as may be apparent to those of skill in the art. Additionally, any suitable combination of steps in the methods described herein may be performed concurrently as may be apparent to those of skill in the art. Except where explicitly indicated, embodiment methods are not intended to be limited to the specific order of the method steps as shown and described which may be chosen for reasons of clarity and brevity.

FIG. 1 illustrates a method of cryptographically aligning a secure element with a host device in accordance with an embodiment of the invention.

Referring to FIG. 1, a cryptographic alignment method 100 includes an initial state 10 in which a secure element and a host device are uncorrelated. For example, the secure element and the host device may not be initialized in the initial state 10. The secure element and/or the host device may or may not include stored executable code or data unrelated to the alignment process at the initial state 10. Specifically, no information that links the secure element to the host device is stored on either the secure element or the host device in the initial state 10.

After the initial state 10 during which the secure element and the host device are uncorrelated, step 104 includes storing binding information $B_{SE}$ in secure memory of the secure element. The binding information $B_{SE}$ is cryptographically correlated to the host key information $HK_{SE}$ and may be used in combination with other information to generate host key information $HK_{SE}$. Optionally, the host key information $HK_{SE}$ may be stored in a host key information slot SE-$HK_{SE}$ of the secure element in step 102 of cryptographic alignment method 100. The binding information $B_{SE}$ may also be cryptographically correlated with (e.g. generated from or otherwise based on) a first secret key $SK_1$ which may optionally be stored in the secure memory of the secure element in step 105. In some embodiments, the first secret key $SK_1$ may be used in combination with the binding information $B_{SE}$ to generate the host key information $HK_{SE}$.

In step 107, a second secret key $SK_2$ is stored within system operational code stored in protected memory of the host device. The second secret key $SK_2$ is cryptographically correlated with the host key information $HK_{SE}$. The second secret key $SK_2$ can be used in combination with the binding information $B_{SE}$ to generate the host key information $HK_{SE}$. Once the binding information $B_{SE}$ is stored in the secure element in step 104 and the second secret key $SK_2$ is stored in the host device in step 107, the secure element and the host device are cryptographically aligned as shown in aligned state 120. In other words, in the aligned state 120, both the secure element and the host device have information stored thereon that may be used to generate the host key information.

The steps involving the secure element (i.e. step 104 and optional steps 102 and 105) may be performed at a manufacturing location of the secure element. For example, any of the steps 102, 104, and 105 may be performed on a personalization line at a secure location. Similarly, step 107 (which involves the host device) may be performed at a manufacturing location of the host device, such as a personalization line of the host device. The host device manufacturing location may or may not be secure. The secure element manufacturing location and the host device manufacturing location may be geographically separate locations. Put another way, the secure element manufacturing location may be remote to the host device manufacturing location.

Since both the binding information $B_{SE}$ and the second secret key $SK_2$ are correlated with the host key information $HK_{SE}$ it may be necessary to securely transport secret information from the secure element manufacturing location to the host device manufacturing location in an optional step 106. Alternatively, the secret information may be securely transported from the host device manufacturing location to the secure element manufacturing location. In some embodiments, the secret information may be used for more than one alignment process rendering it unnecessary to repeatedly transport the information between locations. In other embodiments, no secret information is transported between the secure element manufacturing location and the host device manufacturing location because the host key information $HK_{SE}$ is not generated at either location.

Figure 2:
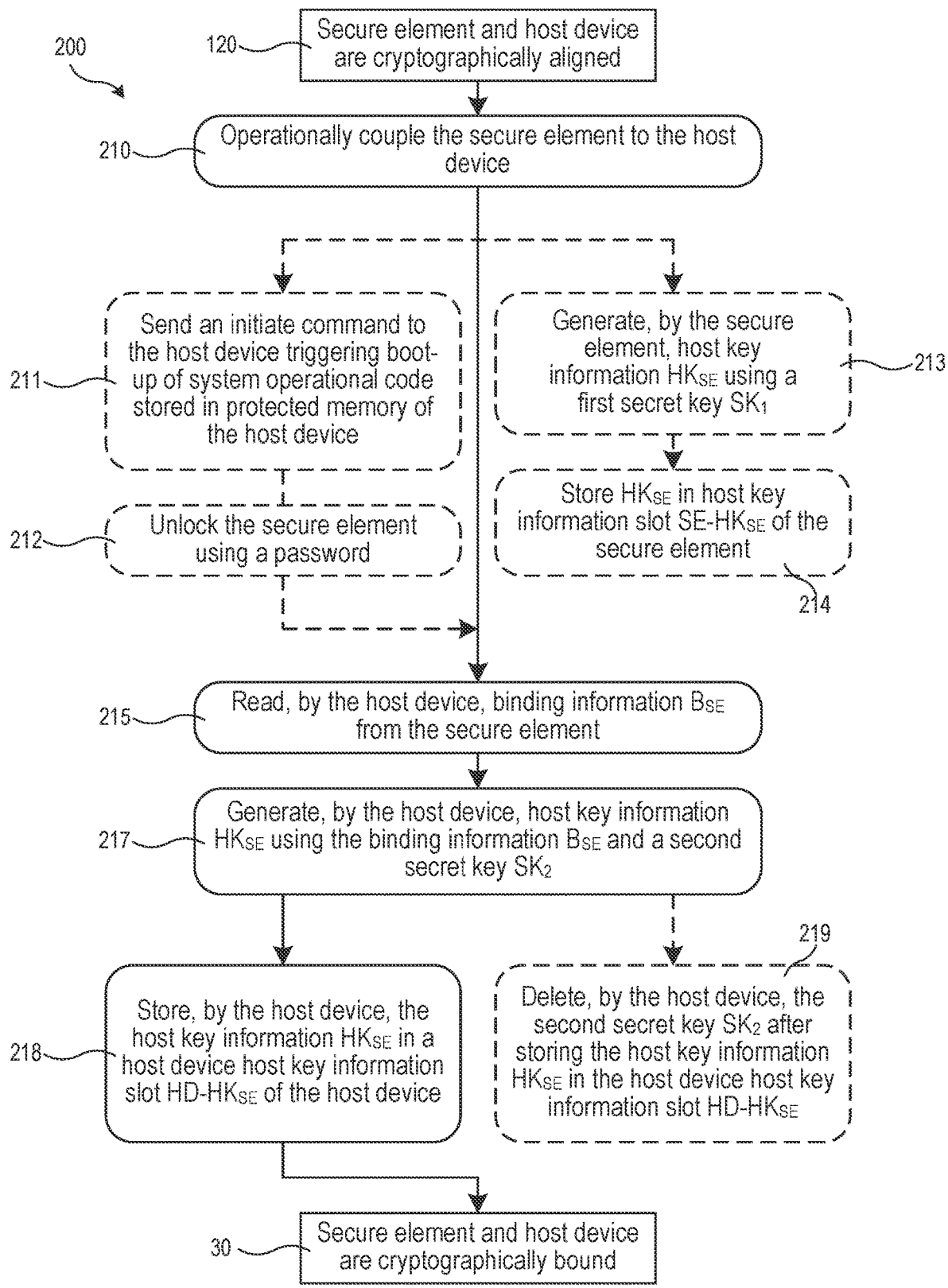
FIG. 2 illustrates a method of cryptographically binding a secure element to a host device in accordance with an embodiment of the invention.

FIG. 2 illustrates a method of cryptographically binding a secure element to a host device in accordance with an embodiment of the invention.

Referring to FIG. 2, a cryptographic binding method 200 includes an initial state which is an aligned state 120 in which a secure element and a host device are cryptographically aligned. The alignment may be performed in accordance with cryptographic alignment methods as describe herein, such as the cryptographic alignment method 100 of FIG. 1, for example. The alignment process may be geographically separated from a binding location where the cryptographic binding method 200 is performed and at which the secure element and the host device are collocated. For example, the binding location may be at a manufacturer of a device using both ICs that is remote to locations such as a secure element manufacturing location and a host device manufacturing location.

After the aligned state 120, the secure element is operationally coupled to the host device in step 210. In one embodiment, operationally coupling the secure element to the host device includes connecting the secure element to the host device using an electrical bus over which commands and data can be sent. Alternatively, the secure element and the host device may be directly connected or packaged together, such as in a system-on-a-chip configuration, for example.

All general functionality of the secure element may be disabled at the moment of operational coupling to the host device. The secure element is configured to operate in a predetermined capacity during the binding process in order to establish a paired (i.e. cryptographically bound) relationship with a host device. After step 210 of operationally coupling the secure element to the host device, the binding process may optionally be initiated by sending a predetermined command to the host device in step 211. The initiate command may trigger boot-up of system operational code stored in protected memory of the host device. Alternatively, the binding process may be triggered without an initiate command, such as automatically when the host device and the secure element receive power.

At the beginning of the binding process, the secure element may be locked. For example, the secure element may optionally be unlocked by a password in step 212. In one embodiment, the password is a batch password that can be used for multiple binding processes and which is changed periodically to avoid security issues. The batch password may be known at the location of the binding process, but may be transported to the location separately from both the secure element and the host device. In this way, an unauthorized party would be unable to initiate the binding process by merely intercepting the secure element and the host device. When an initiate command is used to begin the binding process, the initiate command may include the password so that the system operational code of the host device uses the password to unlock the secure element to continue the binding process.

After step 210, the host device reads the binding information $B_{SE}$ from the secure element in step 215. The binding information $B_{SE}$ may be transmitted between the secure element and the host device over an insecure data link such as an electrical bus. However, the host key information $HK_{SE}$ is advantageously not compromised in the event of the binding information $B_{SE}$ being intercepted by a nefarious party because additional information is needed with the binding information $B_{SE}$ in order to generate the host key information $HK_{SE}$.

Once the host device has read the binding information $B_{SE}$ from the secure element, the host device generates the host key information $HK_{SE}$ using the binding information $B_{SE}$ and the second secret key $SK_2$ stored in the host device in step 217. More information may also be used in addition to the binding information $B_{SE}$ and the second secret key $SK_2$ to generate the host key information $HK_{SE}$. For example, the password used to unlock the secure element may also be used by the host device in conjunction with the binding information $B_{SE}$ and the second secret key $SK_2$ to generate the host key information $HK_{SE}$ in some embodiments. In various embodiments, the host device may generate the first secret key $SK_1$ from the second secret key $SK_2$ and generate the host key information $HK_{SE}$ using the binding information $B_{SE}$ and the first secret key $SK_1$.

In step 218, once the host device has generated the host key information $HK_{SE}$, the host device stores the host key information $HK_{SE}$ in a host key information slot HD-$HK_{SE}$ of the host device. The secure element is cryptographically bound to the host device in bound state 30 once the host key information $HK_{SE}$ is stored in both the secure element and the host device. The secure element may optionally generate the host key information using the first secret key $SK_1$ in step 213 and store the host key information $HK_{SE}$ in a host key information slot SE-$HK_{SE}$ of the secure element in step 214. Alternatively, the host key information $HK_{SE}$ may have been generated and stored in the secure element prior to the cryptographic binding method 200.

After the host key information $HK_{SE}$ is generated by the host device in step 217, the second secret key $SK_2$ may optionally be deleted from the host device in step 219. For example, the second secret key $SK_2$ may be deleted from both volatile memory (e.g. random-access memory) and nonvolatile memory (e.g. program memory). Additional information related to the generation of the host key information $HK_{SE}$ may also be deleted from the host device such as the binding information $B_{SE}$ and the batch password.

In the event that there is a problem during the binding process in which the host key information is improperly installed in the host device, it may be impossible or infeasible to recover the host device. The binding process may be conducted in protected memory of the host device which may include various safeguards. For example, the capability to enter a debug mode may be turned off or fused following the binding process. Therefore, if there is a problem during the binding process such that, after the binding process, the host device is not successfully bound to the secure element, the host device is effectively unusable. In one embodiment, a secure-backup-data file may be stored on the secure element that may be retrieved by an out-of-band process in the event that the host key information that is installed on a host device is not uncorrupted. The secure-backup-data file may be an encrypted object that can be used to resurrect host devices that have encountered a problem during the binding process.

Figure 3:
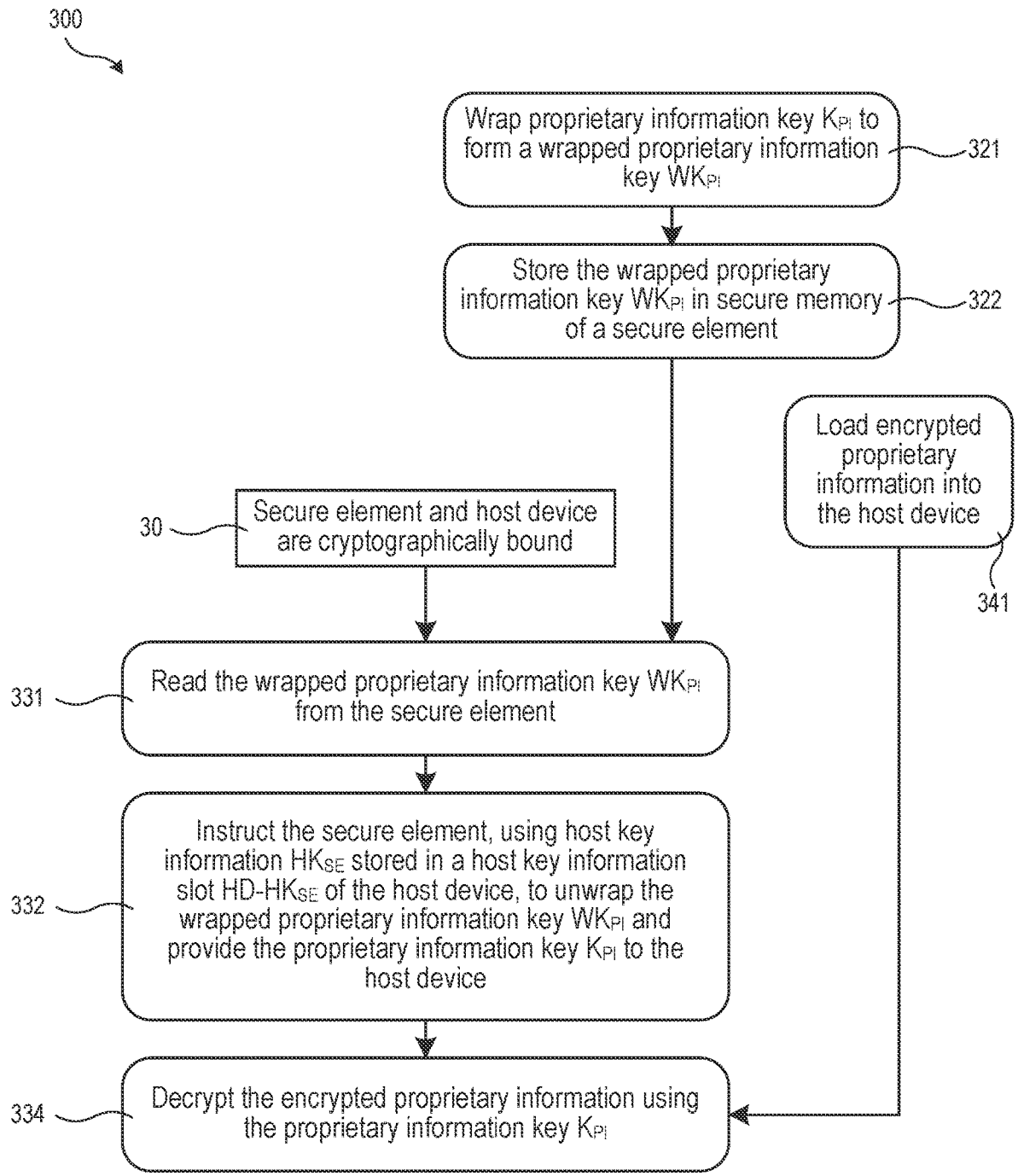
FIG. 3 illustrates a method of securely acquiring proprietary information by a host device cryptographically bound to a secure element in accordance with an embodiment of the invention.

FIG. 3 illustrates a method of securely acquiring proprietary information by a host device cryptographically bound to a secure element in accordance with an embodiment of the invention.

Referring to FIG. 3, a method of securely acquiring proprietary information 300 includes a bound state 30 in which a secure element and a host device are cryptographically bound. The binding may be performed in accordance with cryptographic binding methods as described herein, such as the cryptographic binding method 200 of FIG. 2, for example.

Prior to the bound state 30, a proprietary information key $K_{PI}$ is wrapped in step 321 to form a proprietary information key $WK_{PI}$. The proprietary information key $K_{PI}$ may be an encryption key. For example, the proprietary information key $K_{PI}$ may be an AES key. In one embodiment, the proprietary information key $K_{PI}$ is a 256 bit AES key. There may be any suitable number of proprietary information keys which correspond with any suitable number of encrypted blocks of proprietary information.

The proprietary information key $K_{PI}$ may be wrapped by the secure element at a secure element manufacturing location during initialization of the secure element. In some embodiments, the proprietary information key $K_{PI}$ may be wrapped using a local enveloped key known only to the secure element. In other words, only the secure element can recover the proprietary information key $K_{PI}$.

The wrapped proprietary information key $WK_{PI}$ is then stored in secure memory of the secure element in step 322. The secure memory may be partitioned (or zoned) to further improve security of the stored data. Additional wrapped proprietary information keys may also be stored in the secure memory of the secure element. The wrapped proprietary information key $WK_{PI}$ may be stored in the secure element at the secure element manufacturing location. Alternatively, the wrapped proprietary information key $WK_{PI}$ may be stored in the secure element at a different location prior to being bound to the host device.

At some time after the wrapped proprietary information key $WK_{PI}$ is stored in the secure element and once the secure element and the host device are in the bound state 30, the host device reads the wrapped proprietary information key $WK_{PI}$ from the secure element in step 331. The host device then instructs the secure element to unwrap the wrapped proprietary information key $WK_{PI}$ and provide the host device with the proprietary information key $K_{PI}$ in step 332.

Since the secure element and the host device are cryptographically bound, the host device uses the host key information $HK_{SE}$ to communicate with the secure element in steps 331 and 332. For example, the read command in step 331 may be authenticated by the secure element using a MAC key that is part of the host key information $HK_{SE}$. Similarly, when the secure element provides the proprietary information key $K_{PI}$ to the host device, the secure element may encrypt the proprietary information key $K_{PI}$ using an encryption key that is part of the host key information $HK_{SE}$ before sending it to the host device. The host device can read the proprietary information key $K_{PI}$ because the host device also has the host key information $HK_{SE}$. In contrast, an unauthorized party advantageously cannot read the proprietary information key $K_{PI}$ in the event that it is intercepted between the secure element and the host device because the host key information $HK_{SE}$ is known only to the secure element and the host device.

At some time before step 334, encrypted proprietary information is loaded into the host device in step 341. For example, the encrypted proprietary information may be loaded into the host device during initialization at a host device manufacturing location. Alternatively, the encrypted proprietary information may be loaded into the host device at the binding location by chipset initialization equipment. However, the encrypted proprietary information may be loaded into the host device at any time prior to step 334. For example, the encrypted proprietary information may be loaded into the host device after step 332 in some embodiments.

At step 334, the host device has both the encrypted proprietary information and the proprietary information key $K_{PI}$. The host device decrypts the encrypted proprietary information using the proprietary information key $K_{PI}$ to obtain the proprietary information. The proprietary information may be any type of restricted information. In various embodiments, the proprietary information is proprietary executable computer code. In one embodiment, the proprietary information is firmware and the method of securely acquiring proprietary information 300 is part of a secure firmware installation (SFI). In other embodiments, the proprietary information is software that is installed on the host device. For example, a database at the binding location may store multiple blocks of encrypted proprietary information. The encrypted proprietary information cannot be used at the binding location without corresponding proprietary information keys. In this way, the secure element can advantageously be used as a hardware license to authorize a host device to install proprietary information such as firmware at the binding location without compromising the security of the proprietary information.

As an alternative to the host device decrypting the encrypted proprietary information directly, the secure element may instead directly decrypt encrypted blocks of proprietary information sent by the host device. For example, the secure element may use a pre-stored, shared key for the purpose of decrypting the proprietary information. The shared key may be stored in a key table. After the secure element and the host device are paired, the host device may command the secure element to decrypt blocks of encrypted proprietary information during an installation process (e.g. a secure firmware installation). This may provide an additional advantage of the shared key only being used by the secure element rather than the host device and the secure element. In other embodiments, the secure element may use the shared key to decrypt a firmware encryption key that is sent to the secure element (e.g. in a first stage bootloader) at the time of the firmware installation. In addition, shared keys that are pre-stored in a key table of the secure element may also be used by the secure element for other purposes (e.g. to decrypt other keys corresponding to other proprietary information).

In some embodiments, the secure element may be used to validate installation of multiple blocks of proprietary information. A counter may be included in the secure element that is decremented each time a proprietary information key is used. The secure element may disallow a host device to obtain access to proprietary information once the counter is equal to zero. Alternatively, multiple counters may be included in the secure element which may be decremented on a per key basis each time a specific proprietary information key is used. The secure element can then provide a further advantage of enforcing bulk license agreements for proprietary firmware and/or software.

Figure 4:
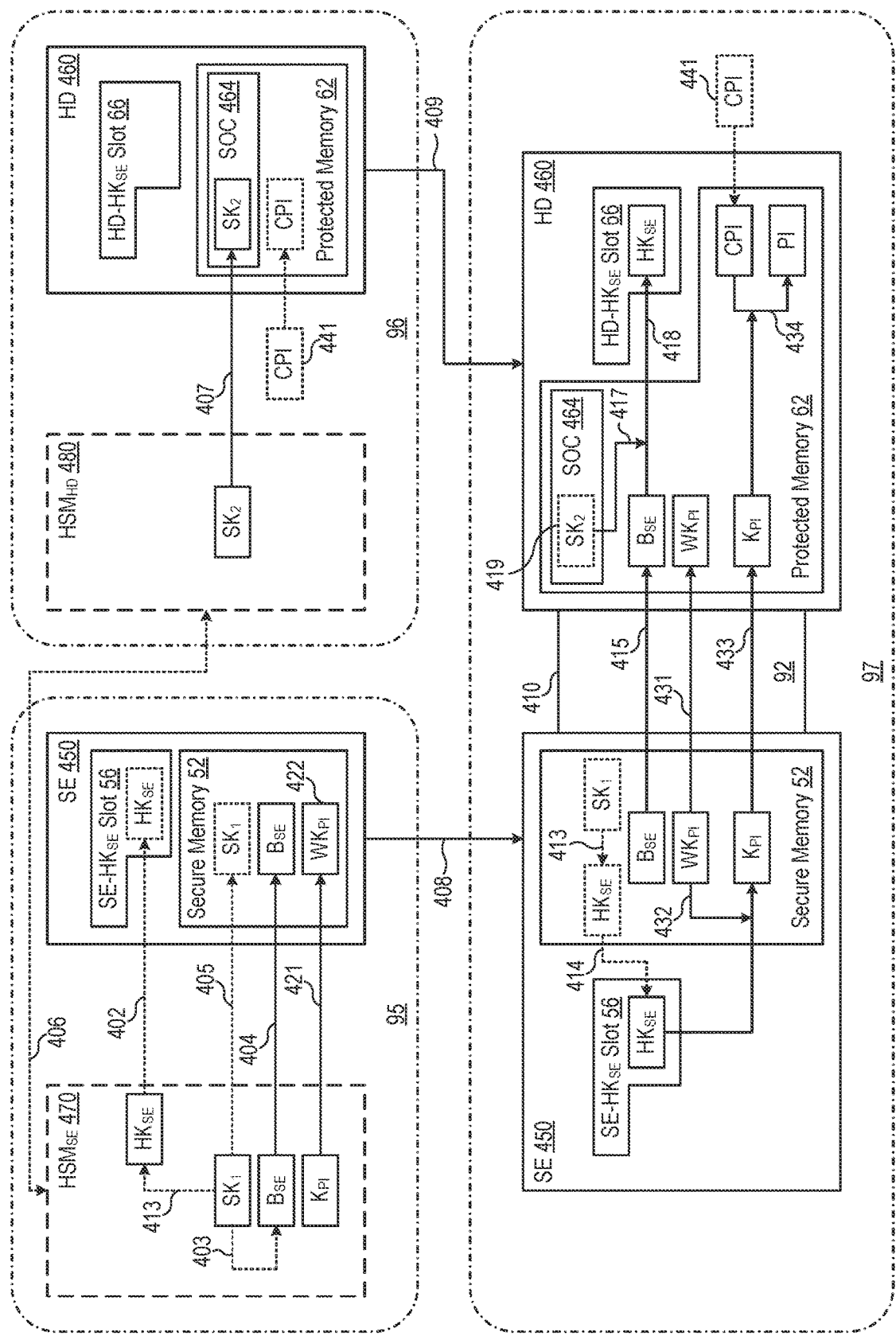
FIG. 4 illustrates schematic block diagrams of a secure element, host device, and hardware security modules usable for cryptographic alignment, binding, and secure acquisition of proprietary information in accordance with an embodiment of the invention.

FIG. 4 illustrates schematic block diagrams of a secure element, host device, and hardware security modules usable for cryptographic alignment, binding, and secure acquisition of proprietary information in accordance with an embodiment of the invention. The schematic block diagrams of FIG. 4 may schematically illustrate implementations of one or more of the methods described herein, such as the cryptographic alignment method 100, the cryptographic binding method 200, and the method of acquiring proprietary information 300 of FIGS. 1, 2, and 3 respectively, as examples.

Referring to FIG. 4, a secure element 450 (SE 450) and optionally a secure element hardware security module 470 ($HSM_{SE}$ 470) are located at a secure element manufacturing location 95. The secure element manufacturing location 95 may be a secure (e.g. trusted) facility. In various embodiments, the secure element manufacturing location 95 includes equipment such as the $HSM_{SE}$ 470 which can securely generate and certify cryptographic information for devices such as the secure element 450. For example, the $HSM_{SE}$ 470 may generate one or more of host key information $HK_{SE}$, binding information $B_{SE}$, a first secret key $SK_1$, and a proprietary information key $K_{PI}$.

It should be noted that the secure element manufacturing location 95 may also be the fabrication location for the secure element 450, but this is not a requirement. For example, the secure element 450 may be fabricated at a different location and shipped in an uninitialized state to the secure element manufacturing location 95 where it is initialized on a secure element personalization line.

The secure element 450 includes a secure element host key information slot 56 (SE-$HK_{SE}$ slot 56) configured to securely store the host key information $HK_{SE}$. For example, one or more memory storage locations of fixed size corresponding to the key size of one or more host keys may be included in the SE-$HK_{SE}$ slot 56. The SE-$HK_{SE}$ slot 56 may be part of the firmware of the secure element 450. In one embodiment, the SE-$HK_{SE}$ slot 56 includes a 128 bit slot. Alternatively or additionally, the SE-$HK_{SE}$ slot 56 includes a 192 bit slot, a 196 bit slot, a 256 bit slot, or any other suitable slot size according to the desired strength of security. The secure element 450 may also include any suitable number of additional key slots such as a local envelope slot, a public key slot, one or more private key slots (e.g. a private key table), and the like.

The host key(s) included in the host key information $HK_{SE}$ may conform to an encryption scheme. In one embodiment, the host key information $HK_{SE}$ includes advanced encryption standard (AES) key(s). However, the host key information $HK_{SE}$ may also include triple data encryption standard (3DES), Twofish, and Blowfish keys, among others. It should also be noted that although the preceding encryption schemes describe symmetric encryption schemes, asymmetric encryption schemes may also be applied to keys or generate keys included in the host key information $HK_{SE}$. For example the host key information $HK_{SE}$ may include or be generated by elliptic-curve cryptography (ECC), elliptic-curve Diffie-Hellman (ECDH), the Rivest-Shamir-Adleman (RSA) algorithm, and others.

The host key information $HK_{SE}$ may optionally be stored in the SE-$HK_{SE}$ slot 56 of the secure element 450 at the secure element manufacturing location 95 in a step 402. The host key information $HK_{SE}$ may optionally be generated using the first secret key $SK_1$ in step 413 and optionally stored in secure memory 52 of the secure element 450 in step 405. Binding information $B_{SE}$ is stored in the secure memory 52 of the secure element 450 in step 404. The binding information $B_{SE}$ may optionally be generated using the first secret key $SK_1$ in step 403.

The proprietary information key $K_{PI}$ is wrapped to form a wrapped proprietary information key $WK_{PI}$ in step 421. The wrapped proprietary information key $WK_{PI}$ is stored in the secure memory 52 of the secure element 450 in step 422. For example, the $HSM_{SE}$ 470 may provide the proprietary information key $K_{PI}$ instruct the secure element 450 to wrap the proprietary information key $K_{PI}$ to form the wrapped proprietary information key $WK_{PI}$ and store the wrapped proprietary information key $WK_{PI}$ in the secure memory 52. The secure element 450 may use a local envelop key known only to the secure element 450 to wrap the proprietary information key $K_{PI}$. In this way, only the secure element 450 is capable of recovering the proprietary information key $K_{PI}$ from the wrapped proprietary information key $WK_{PI}$.

Still referring to FIG. 4, a host device 460 (HD 460) and optionally a host device hardware security module 480 ($HSM_{HD}$ 480) are located at a host device manufacturing location 96. In various embodiments, the host device manufacturing location 96 is geographically separate from (i.e. remote to) the secure element manufacturing location 95. The host device manufacturing location 96 may be a secure (e.g. trusted) facility. The security level of the host device manufacturing location 96 may be equal to or less than the security level of the secure element manufacturing location 95. For example, as illustrated in FIG. 4, both the secure element manufacturing location 95 and the host device manufacturing location 96 may include an HSM to securely generate and certify cryptographic information. However, in various embodiments, the $HSM_{HD}$ 480 may not issue certificates and instead rely on information that is securely transported to the host device manufacturing location 96 from the secure element manufacturing location 95.

The host device 460 includes a host device host key information slot 66 ($HD-HK_{SE}$ slot 66) configured to securely store the host key information $HK_{SE}$ after the binding process. Although the $HD-HK_{SE}$ slot 66 is not required to be similar to the $SE-HK_{SE}$ slot 56, the $HD-HK_{SE}$ slot 66 is substantially similar to the $SE-HK_{SE}$ slot 56 in several embodiments. That is, the memory size of the $HD-HK_{SE}$ slot 66 is substantially similar to the memory size of the $SE-HK_{SE}$ slot 56 in several embodiments. The $HD-HK_{SE}$ slot 66 may be part of the firmware of the host device 460.

A second secret key $SK_2$ is generated and stored in system operational code 464 (SOC 464) of the host device 460 in step 407. For example, the $HSM_{HD}$ 480 may generate the second secret key $SK_2$. The system operational code 464 may function as a secure bootloader for the host device. The system operational code 464 is stored in protected memory 62 of the host device 460. That is, the protected memory 62 may be memory that is protected from readout. Protected memory 62 may include nonvolatile memory (NVM) such as flash memory that cannot be read by an external device. Protected memory 62 may also include read-only memory (ROM) that cannot be modified by programming instructions. Some or all of the system operational code 464 may be stored in ROM. Protected memory 62 may also include random-access memory (RAM). Within the scope of this disclosure, data stored in protected memory 62 is considered to be protected from unauthorized access at least while performing the methods described herein and is intended to include all forms of memory suitable for such a purpose. Further, the protected memory 62 may be implemented in any suitable manner such as attack resistant technology (e.g. TrustZone® in an advanced reduced instruction set computing (RISC) machine (ARM) processor), or using any suitable means of making the protected memory 62 secure against software or hardware attacks may be utilized.

Since the binding information $B_{SE}$ at the secure element manufacturing location 95 and the second secret key $SK_2$ at the host device manufacturing location 96 are both cryptographically correlated to the host key information $HK_{SE}$ used as a basis to cryptographically bind the secure element 450 and the host device 460, secret information may optionally be securely transported from the secure element manufacturing location 95 to the host device manufacturing location 96 in step 406. Secret information may also be securely transported from the host device manufacturing location 96 to the secure element manufacturing location 95.

The second secret key $SK_2$ may be generated at the host device manufacturing location 96 using the secret information from the secure element manufacturing location 95. In some embodiments, the secret information may also be used to generate the first secret key $SK_1$ at the secure element manufacturing location 95. For example, the secret information may be another secret key known at both the locations and securely stored in both the $HSM_{SE}$ 470 and the $HSM_{HD}$ 480. Alternatively, the first secret key $SK_1$ and the second secret key $SK_2$ may be the same key. In other embodiments, the first secret key $SK_1$ and the second secret key $SK_2$ may be independent of one another.

Encrypted proprietary information CPI may optionally be stored in protected memory 62 in step 441. Alternatively, the encrypted proprietary information CPI may be provided to the host device 460 at a different location (e.g. during or after the binding process). The encrypted proprietary information CPI may be decrypted using the proprietary information key $K_{PI}$ to generate proprietary information PI. Since the encrypted proprietary information CPI is protected by encryption, the encrypted proprietary information CPI may also be stored in unprotected NVM of the host device in some embodiments.

The secure element 450 may be cryptographically bound to the host device 460 at a chipset manufacturing location 97 which may be geographically separate from (i.e. remote to) both the secure element manufacturing location 95 and the host device manufacturing location 96. The secure element 450 is transported from the secure element manufacturing location 95 to the chipset manufacturing location 97 in step 408. Similarly, the host device 460 is transported from the host device manufacturing location 96 to the chipset manufacturing location 97 in step 409. At this point, the secure element 450 and the host device 460 are collocated at the chipset manufacturing location 97. That is, the secure element 450 and the host device 460 are physically in the same location.

The secure element 450 is operatively coupled to the host device 460 in step 410. For example, an electrical bus such as a data bus 92 may couple the secure element 450 to the host device 460. Chipset initialization equipment may also be included to initiate the pairing process. Chipset initialization equipment may also optionally provide the encrypted proprietary information CPI in step 441 at the chipset manufacturing location 97 if the encrypted proprietary information CPI was not provided earlier.

The host device 460 reads the binding information $B_{SE}$ from the secure element 450 in step 415. The binding information $B_{SE}$ travels on the data bus 92, but does not jeopardize the security of the host key information $HK_{SE}$ because the host key information $HK_{SE}$ cannot be generated solely from the binding information $B_{SE}$. The host device 460 generates the host key information $HK_{SE}$ using the binding information $B_{SE}$ and the second secret key $SK_2$ in step 417 and stores the host key information $HK_{SE}$ in the $HD-HK_{SE}$ slot 66 of the host device 460 in step 418. After the host key information $HK_{SE}$ has been installed in the $HD-HK_{SE}$ slot 66 of the host device 460, the second secret key $SK_2$ is optionally deleted in step 419 to further protect the anonymity of the host key information $HK_{SE}$. For example the binding process stored in the system operational code 464 may be atomic and delete all key material as soon as it is used.

After the host key information $HK_{SE}$ is stored in both the $SE-HK_{SE}$ slot 56 and the $HD-HK_{SE}$ slot 66, the secure element 450 and the host device 460 are cryptographically bound. Optionally, if the host key information $HK_{SE}$ was not stored in the $SE-HK_{SE}$ slot 56 at the secure element manufacturing location 95, the host key information $HK_{SE}$ may be generated by the secure element 450 using the first secret key $SK_1$ together with additional information in step 413 and stored in the $SE-HK_{SE}$ slot 56 in step 414. The additional information may be provided by the host device 460, for example.

After the secure element 450 and the host device 460 are cryptographically bound, the host device 460 uses the host key information $HK_{SE}$ stored in the $HD-HK_{SE}$ slot 66 to read the wrapped proprietary information key $WK_{PI}$ from the secure element 450 in step 431 and instruct the secure element 450 to unwrap the wrapped proprietary information key $WK_{PI}$ to generate the proprietary information key $K_{PI}$ in step 432. The proprietary information key $K_{PI}$ is then provided to the host device 460 in step 433. In step 434, the host device 460 uses the proprietary information key $K_{PI}$ to decrypt the encrypted proprietary information CPI and generate the proprietary information PI. Advantageously, since the secure element 450 and host device 460 are paired using the host key information $HK_{SE}$ which has not been compromised, the proprietary information key $K_{PI}$ is encrypted using the host key information $HK_{SE}$ by the secure element 450 after being unwrapped and is not exposed during transport on data bus 92.

Figure 5:
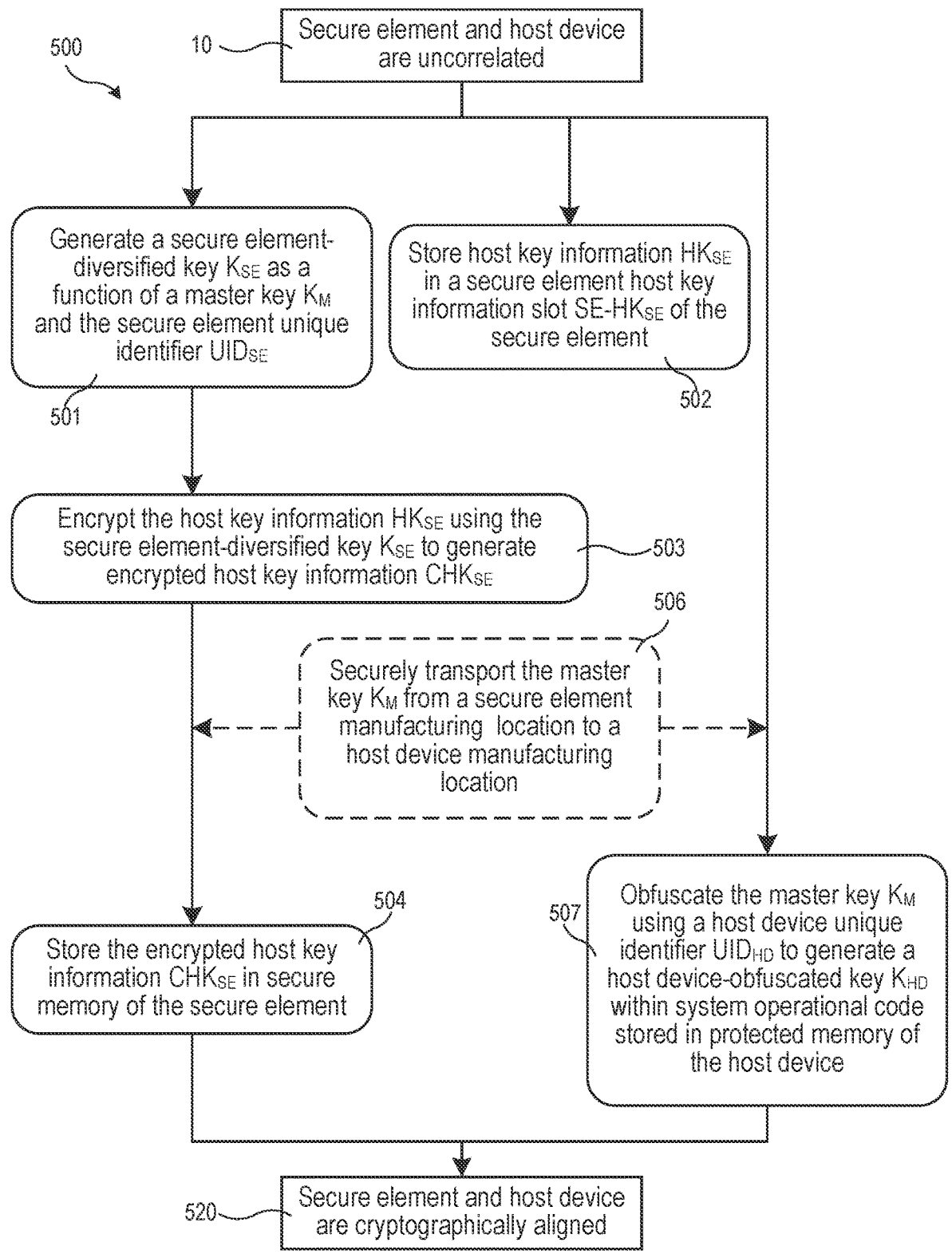
FIG. 5 illustrates a method of cryptographically aligning a secure element with a host device using a master key and encrypted host key information in accordance with an embodiment of the invention.
Figure 6:
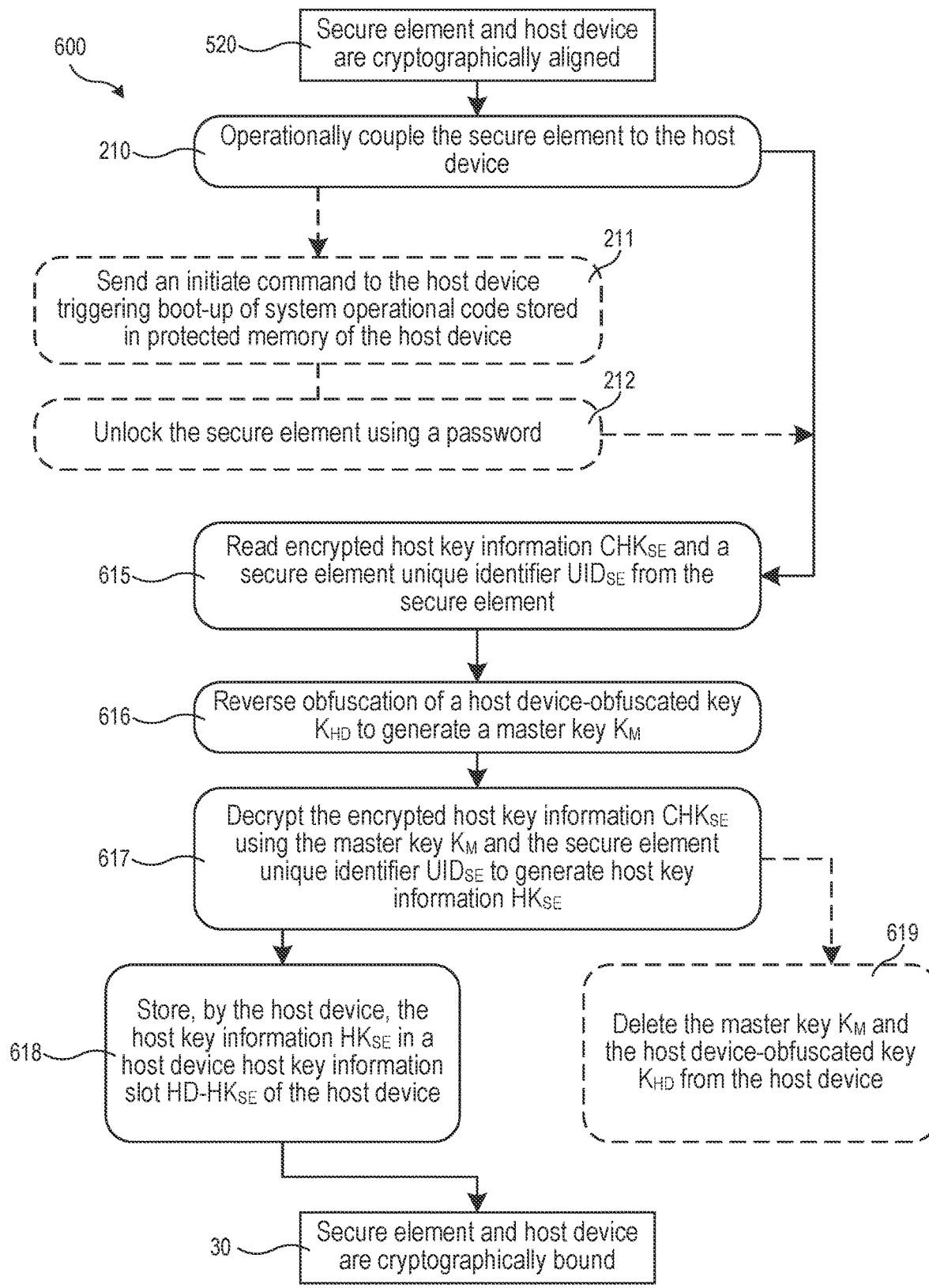
FIG. 6 illustrates a method of cryptographically binding a secure element to a host device using a master key and encrypted host key information in accordance with an embodiment of the invention.

FIG. 5 illustrates a method of cryptographically aligning a secure element with a host device using a master key and encrypted host key information in accordance with an embodiment of the invention. The method of FIG. 5 may be a specific implementation of other methods described herein, such as the cryptographic alignment method 100 of FIG. 1, for example. Similarly labeled elements may be as previously described.

Referring to FIG. 5, a cryptographic alignment method 500 includes the initial state 10 which may be as previously described. A secure element-diversified key $K_{SE}$ is generated as a function of a master key $K_M$ and a secure element unique identifier $UID_{SE}$ in step 501. In various embodiments the secure element-diversified key $K_{SE}$ is an AES key and is a 128 bit AES key in one embodiment. Similarly, the master key $K_M$ is an AES key in some embodiments and is a 128 bit AES key in one embodiment.

The master key $K_M$ is secret information. The master key $K_M$ may only be internally known by hardware security equipment, for example. The secure element unique identifier $UID_{SE}$ uniquely identifies the secure element. Advantageously, the secure element-diversified key $K_{SE}$ is a cryptographic secret due to the dependence on the master key $K_M$. Additionally, the secure element-diversified key $K_{SE}$ is unique to the secure element because of the dependence on the secure element unique identifier $UID_{SE}$. In some embodiments, the secure element-diversified key $K_{SE}$ may be generated without using a unique identifier.

Optionally, the secure element-diversified key $K_{SE}$ may also be generated in step 501 as a function of the master key $K_M$, the secure element unique identifier $UID_{SE}$, and a password. For example, the password may be a batch password that is the same for a batch of secure elements, but that is changed periodically. In contrast, the master key $K_M$ may not be changed or may only be changed if there is reason to believe it has been compromised (i.e. a static or semi-static key). If a unique identifier is not used in step 501, the secure element-diversified key $K_{SE}$ may also be generated in step 501 as a function of the master key $K_M$ and the password.

The secure element-diversified key $K_{SE}$ is an AES key in various embodiments, and is After the secure element-diversified key $K_{SE}$ is generated in step 501, host key information $HK_{SE}$ is encrypted using the secure element-diversified key $K_{SE}$ to generate encrypted host key information $CHK_{SE}$ in step 503. The encrypted host key information $CHK_{SE}$ is then stored in secure memory of the secure element in step 504. The host key information $HK_{SE}$ is also stored in a secure element host key information slot (SE-$HK_{SE}$ slot) of the secure element in step 502.

Optionally, if the secure element and the host device are at geographically separate locations, it may be necessary to securely transport the master key $K_M$ from a secure element manufacturing location to a host device manufacturing location in step 506. Alternatively, the master key $K_M$ may already be at both locations at the initial state 10. In some embodiments, the master key $K_M$ could also be securely transported from the host device manufacturing location to the secure element manufacturing location. In applications where a password is used in step 501, the password may also be securely transported from the secure element manufacturing location to the host device manufacturing location in step 506.

The master key $K_M$ is obfuscated using a host device unique identifier $UID_{HD}$ to generate a host device-obfuscated key $K_{HD}$ within system operational code (SOC) stored in protected memory of the host device in step 507. The obfuscation may include encryption or any suitable form of obfuscation within the system operational code or physically within the host device. For example, the obfuscation may also include a form of tamper-resistant memory. The host device-obfuscated key $K_{HD}$ may be different from the secure element-diversified key $K_{SE}$ and has similar cryptographic advantages. As before, in some embodiments, the master key $K_M$ may be obfuscated without using a unique identifier and a password may or may not be included in the obfuscation process. For example, a password which may be the same as the password optionally used in step 501 may be used in step 507 along with the host device unique identifier $UID_{HD}$ to obfuscate the master key $K_M$. The system operational code of the host device is capable of reversing the obfuscation of the host device-obfuscated key $K_{HD}$ to recover the master key $K_M$.

After step 504 and step 507 have both been performed, the secure element is cryptographically aligned with the host device in aligned state 520. Specifically, the encrypted host key information $CHK_{SE}$ is stored in the secure element and the host device-obfuscated key $K_{HD}$ is stored in the host device. The aligned state 520 may be a specific description of other aligned states described herein such as the aligned state 120 of FIG. 1, for example.

FIG. 6 illustrates a method of cryptographically binding a secure element to a host device using a master key and encrypted host key information in accordance with an embodiment of the invention. The method of FIG. 6 may be a specific implementation of other methods described herein, such as the cryptographic binding method 200 of FIG. 2, for example. Similarly labeled elements may be as previously described.

Referring to FIG. 6, a cryptographic binding method 600 includes an initial state which is an aligned state 520 in which a secure element and a host device are cryptographically aligned. The alignment may be performed in accordance with cryptographic alignment methods as describe herein, such as the cryptographic alignment method 500 of FIG. 5, for example. The alignment process may be geographically separated from a binding location where the cryptographic binding method 600 is performed and at which the secure element and the host device are collocated. For example, the binding location may be a chipset manufacturing location that is remote to locations such as a secure element manufacturing location and a host device manufacturing location.

After the aligned state 520, the secure element is operationally coupled to the host device in step 210 as previously described. The binding process may optionally be initiated by sending a predetermined command to the host device in step 211 and the secure element may optionally be unlocked by a password in step 212, also as previously described. After step 210, the host device reads encrypted host key information $CHK_{SE}$ and a secure element unique identifier $UID_{SE}$ from the secure element in step 615. If the secure element unique identifier $UID_{SE}$ was not involved in the cryptographic alignment process that resulted in the aligned state 520, then the secure element unique identifier $UID_{SE}$ may optionally not be read by the host device in step 615.

The host device reverses the host device-obfuscated key $K_{HD}$ to generate the master key $K_M$ in step 616. The reverse obfuscation process may use a password such as may be provided in step 611 and/or step 612. The reverse obfuscation process may also use a host device unique identifier $UID_{HD}$. The host device decrypts the encrypted host key information $CHK_{SE}$ using the master key $K_M$ and the secure element unique identifier $UID_{SE}$ to generate host key information $HK_{SE}$ in step 617. For example, the host device may recreate the secure element diversified key $K_{SE}$ using the master key $K_M$ together with the secure element unique identifier $UID_{SE}$ (and a password if a password was used during the cryptographic alignment process that resulted in the aligned state 520).

After the host key information $HK_{SE}$ is generated by the host device in step 617, the host device stores the host key information $HK_{SE}$ in a host device host key information slot (HD-$HK_{SE}$ slot) of the host device in step 618. Once the host key information $HK_{SE}$ is stored in both the HD-$HK_{SE}$ slot of the host device in step 618 and in the SE-$HK_{SE}$ slot of the secure element prior to the aligned state 520, the secure element is cryptographically bound to the host device in bound state 30, which may be as previously described.

Figure 7:
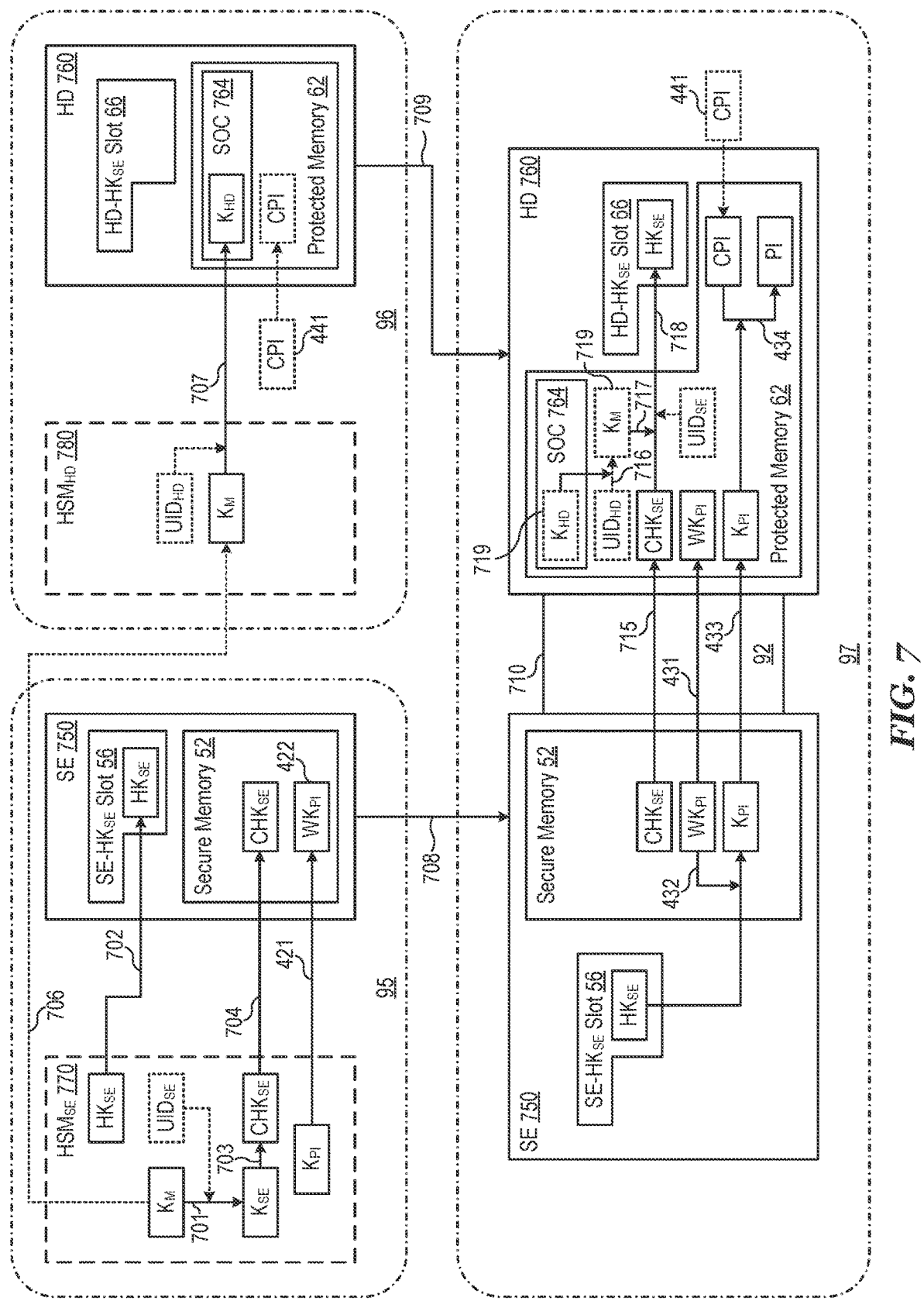
FIG. 7 illustrates schematic block diagrams of a secure element, host device, and hardware security modules usable for cryptographic alignment, binding, and secure acquisition of proprietary information using a master key and encrypted host key information in accordance with an embodiment of the invention.

FIG. 7 illustrates schematic block diagrams of a secure element, host device, and hardware security modules usable for cryptographic alignment, binding, and secure acquisition of proprietary information using a master key and encrypted host key information in accordance with an embodiment of the invention. The schematic block diagrams of FIG. 7 may schematically illustrate implementations of one or more of the methods described herein, such as the cryptographic alignment method 500, the cryptographic binding method 600, and the method of acquiring proprietary information 300 of FIGS. 5, 6, and 3 respectively, as examples. Further, the schematic block diagrams of FIG. 7 may be specific implementations of other schematic block diagrams described herein, such as the schematic block diagrams of FIG. 4, for example. Similarly labeled elements may be as previously described.

Referring to FIG. 7, the schematic block diagrams include a secure element 750 (SE 750), a secure element hardware security module 770 ($HSM_{SE}$ 770), a host device 760 (HD 760), and a host device hardware security module 780. The secure element 750 may be a specific implementation of the secure element 450 of FIG. 4. In the same way, the host device 760 may be a specific implementation of the host device 460 of FIG. 4.

Similar to other hardware security modules previously described, the $HSM_{SE}$ 770 may optionally be included at the secure element manufacturing location 95 and the $HSM_{HD}$ 780 may optionally be included at the host device manufacturing location 96. The $HSM_{SE}$ 770 and the $HSM_{HD}$ 780 may be specific implementations of the $HSM_{SE}$ 470 and the $HSM_{HD}$ 480 of FIG. 4, respectively.

A secure element-diversified key $K_{SE}$ is generated as a function of a master key $K_M$ in step 701. The secure element-diversified key $K_{SE}$ may be generated by the $HSM_{SE}$ 770. A secure element unique identifier $UID_{SE}$ and/or a password such as a batch password may also be used in combination with the master key $K_M$ to generate the secure element-diversified key $K_{SE}$. The secure element-diversified key $K_{SE}$ is used to encrypt host key information $HK_{SE}$ to generate encrypted host key information $CHK_{SE}$ in step 703. The encrypted host key information $HK_{SE}$ is stored in secure memory 52 of the secure element 750 in step 704. Optionally, the master key $K_M$ is securely transported from the secure element manufacturing location 95 to the host device manufacturing location 96 in step 706.

The host key information $HK_{SE}$ is stored in a secure element host key information slot 56 (SE-$HK_{SE}$ slot 56) of the secure element 750 in step 702. The host key information $HK_{SE}$ may be generated by the $HSM_{SE}$ 770. For example, the host key information $HK_{SE}$ may be securely installed in the SE-$HK_{SE}$ slot 56 of the secure element 750 by the $HSM_{SE}$ 770. A proprietary information key $K_{PI}$ is wrapped to form a wrapped proprietary information key $WK_{PI}$ in step 421. The wrapped proprietary information key $WK_{PI}$ is stored in the secure memory 52 of the secure element 750 in step 422.

Still referring to FIG. 7, the master key $K_M$ is obfuscated to generate a host device-obfuscated key $K_{HD}$ and stored in system operational code 764 (SOC 764) of the host device 760 in step 707. For example, the $HSM_{HD}$ 780 may generate the host device-obfuscated key $K_{HD}$. The host device-obfuscated key $K_{HD}$ may be obfuscated using a host device unique identifier $UID_{HD}$ and/or a password such as a batch password. The password may be the same or different from the password that may be used to generate the secure element-diversified key $K_{SE}$ in step 701. Encrypted proprietary information CPI may optionally be stored in protected memory 62 of the host device 1060 in step 441.

The secure element 750 may be cryptographically bound to the host device 760 at a chipset manufacturing location 97 which may be geographically separate from (i.e. remote to) both the secure element manufacturing location 95 and the host device manufacturing location 96. The secure element 750 is transported from the secure element manufacturing location 95 to the chipset manufacturing location 97 in step 708. Similarly, the host device 760 is transported from the host device manufacturing location 96 to the chipset manufacturing location 97 in step 709. At this point, the secure element 750 and the host device 760 are collocated at the chipset manufacturing location 97. That is, the secure element 750 and the host device 760 are physically in the same location.

The secure element 750 is operatively coupled to the host device 760 in step 710. The host device 760 reads the encrypted host key information $CHK_{SE}$ from the secure element 750 in step 715. In step 716, the host device 760 reverses the obfuscation of the host device-obfuscated key $K_{HD}$ to generate the master key $K_M$. The host device unique identifier $UID_{HD}$ and/or the password optionally used in step 707 may be used to in step 716 to reverse the obfuscation. The host device 760 then decrypts the encrypted host key information $CHK_{SE}$ using the master key $K_M$ and optionally the secure element unique identifier $UID_{SE}$ to generate the host key information $HK_{SE}$ in step 717 and stores the host key information $HK_{SE}$ in the HD-$HK_{SE}$ slot 66 of the host device 760 in step 718. For example, the host device 760 may read the secure element unique identifier $UID_{SE}$ from the secure element 750 in step 715 or at some other time after step 710. The host device 760 may use the master key $K_M$ and the secure element unique identifier $UID_{SE}$ to generate the secure element-diversified key $K_{SE}$ internally in order to decrypt the encrypted host key information $CHK_{SE}$.

After the host key information $HK_{SE}$ has been installed in the HD-$HK_{SE}$ slot 66 of the host device 760, the master key $K_M$ and the host device-obfuscated key $K_{HD}$ are optionally deleted in step 719 to further protect the anonymity of the host key information $HK_{SE}$. For example the binding process stored in the system operational code 764 may be atomic and delete all key material as soon as it is used. Once the host key information $HK_{SE}$ is stored in both the SE-$HK_{SE}$ slot 56 and the HD-$HK_{SE}$ slot 66, the secure element 750 and the host device 760 are cryptographically bound.

After the secure element 750 and the host device 760 are cryptographically bound, the host device 760 uses the host key information $HK_{SE}$ stored in the HD-$HK_{SE}$ slot 66 to read the wrapped proprietary information key $WK_{PI}$ from the secure element 750 in step 431 and instruct the secure element 750 to unwrap the wrapped proprietary information key $WK_{PI}$ to generate the proprietary information key $K_{PI}$ in step 432. The proprietary information key $K_{PI}$ is then provided to the host device 760 in step 433. In step 434, the host device 760 uses the proprietary information key $K_{PI}$ to decrypt the encrypted proprietary information CPI and generate the proprietary information PI.

As previously noted, the methods and schematic diagrams of FIGS. 5-7 may be specific implementations of the methods and schematic diagrams of FIGS. 1-4. For example, the encrypted host key information $CHK_{SE}$ may be a specific implementation of the binding information $B_{SE}$. Additionally, the secure element-diversified key $K_{SE}$ and the host device-obfuscated key KED may be specific implementations of the first secret key $SK_1$ and the second secret key $SK_2$ respectively.

Figure 8:
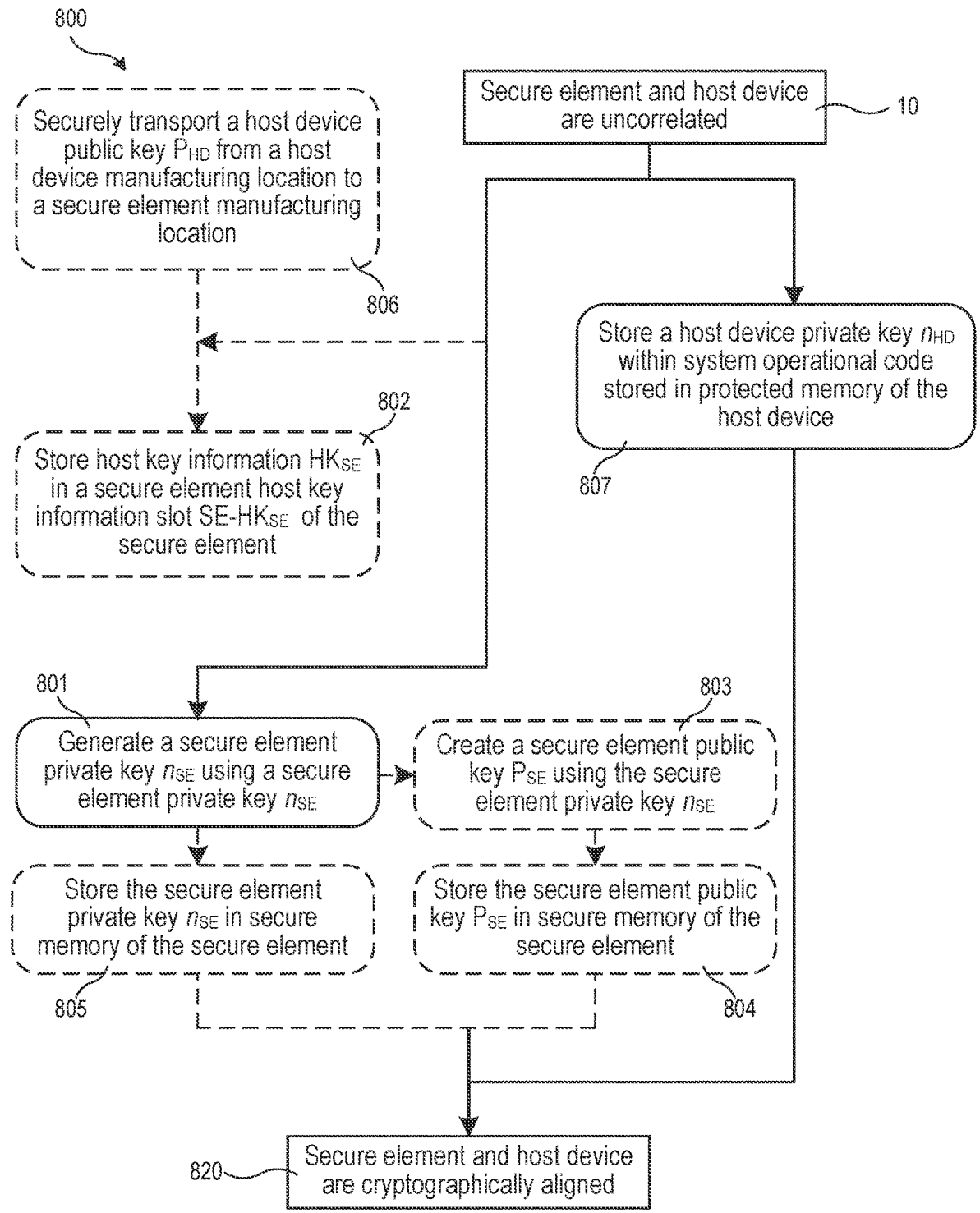
FIG. 8 illustrates a method of cryptographically aligning a secure element with a host device using a secure element public key and a host device private key in accordance with an embodiment of the invention.
Figure 9:
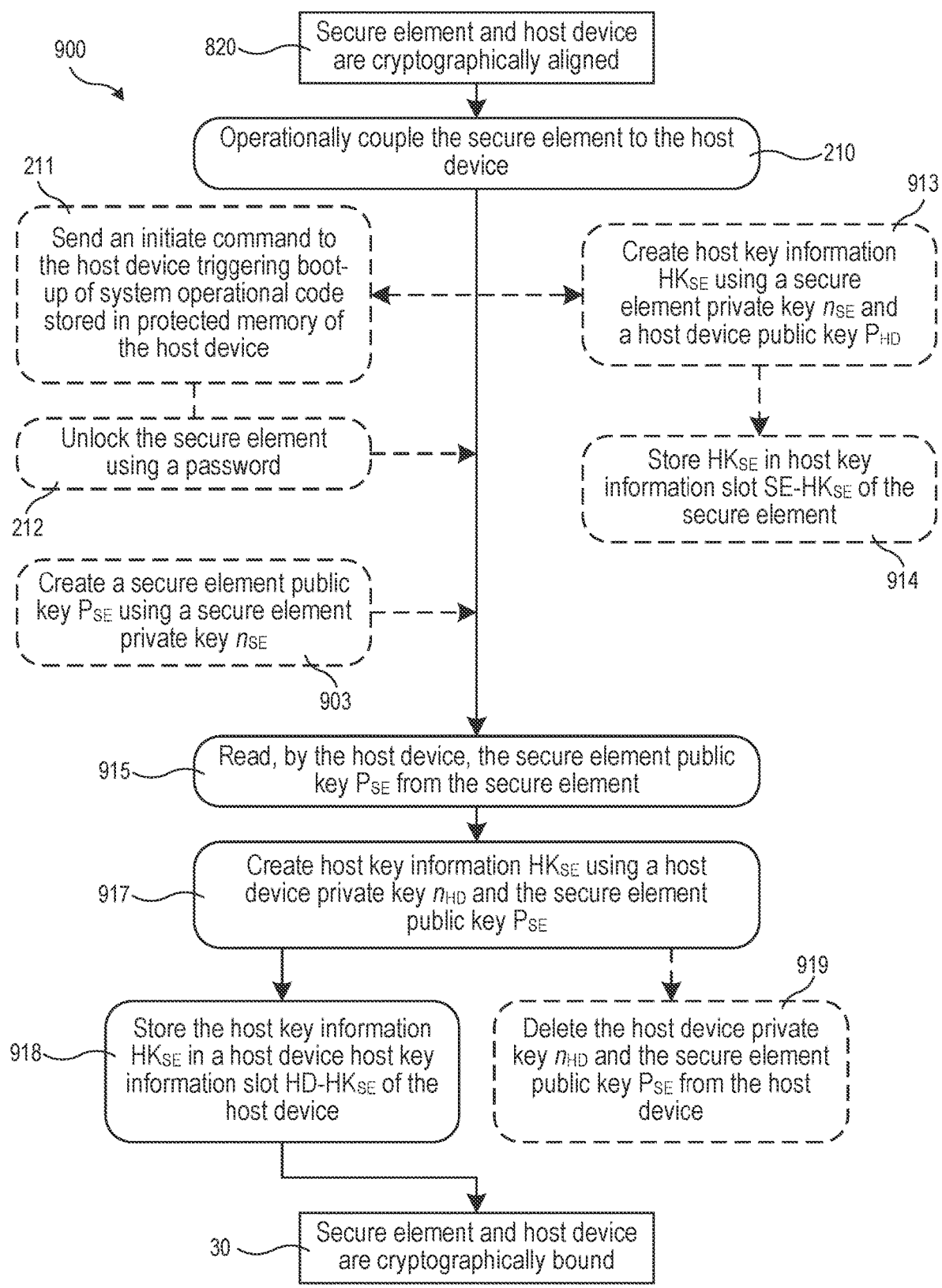
FIG. 9 illustrates a method of cryptographically binding a secure element to a host device using a secure element public key and a host device private key in accordance with an embodiment of the invention.

FIG. 8 illustrates a method of cryptographically aligning a secure element with a host device using a secure element public key and a host device private key in accordance with an embodiment of the invention. The method of FIG. 8 may be a specific implementation of other methods described herein, such as the cryptographic alignment method 100 of FIG. 1, for example. Similarly labeled elements may be as previously described.

Referring to FIG. 8, a cryptographic alignment method 800 includes the initial state 10 which may be as previously described. A secure element private key $n_{SE}$ is generated in step 801. The secure element private key $n_{SE}$ may be an ECC private key that is part of an ECDH key pair in some embodiments. For example, the ECDH key pair may be generated using a preselected set of parameters. The set of parameters may define a prime curve or a binary curve. For example, a prime curve may be over the set of integers {0, 1, . . . p−1} where p is a prime number (i.e. $Z_p$). As another example, a binary curve may be over the Galois field $GF(2^m)$ where m is a positive integer. The preselected set of parameters may conform to a set of recognized standards such as National Institute of Standards and Technology (NIST) recommended curve or an ECC Brainpool standard curve.

The secure element private key $n_{SE}$ may be generated by the secure element or an external entity such as a hardware security module. The secure element private key $n_{SE}$ may be diversified from a master key in one embodiment. For example, the secure element private key $n_{SE}$ may be derived from some combination of a secure element master key, a secure element unique identifier, and a password such as a batch password. The secure element private key $n_{SE}$ may be used to create a secure element public key $P_{SE}$ in step 803. The secure element public key $P_{SE}$ may be an ECC public key of the ECDH key pair, for example. The secure element public key $P_{SE}$ may then be stored in secure memory of the secure element in step 804. Alternatively, creation of the secure element public key $P_{SE}$ may be deferred to a later time and the secure element private key $n_{SE}$ may be stored in secure memory of a secure element in step 805.

A host device private key $n_{HD}$ is stored within system operational code stored in protected memory of the host device in step 807. The host device private key $n_{HD}$ may be an ECC private key that is part of an ECDH key pair and generated according to the same ECC parameters used to generate the ($n_{SE}$, $P_{SE}$) ECDH key pair. The host device private key $n_{HD}$ may be diversified similar to the secure element private key $n_{SE}$ with a host device master key, a host device unique identifier, and a password such as batch password. It should be noted that it may be considered advantageous from a security perspective for the host device private key $n_{HD}$ and the secure element private key $n_{SE}$ to be diversified using separate keys rather than a single master key as in some previously described embodiments. For example, if used, the secure element master key and the host device master key may not be cryptographically correlated.

After the host device private key $n_{HD}$ is stored in the host device in step 807 and either the secure element private key $n_{SE}$ is stored in the secure element in step 805 or the secure element public key $P_{SE}$ is stored in the secure element in step 804, the secure element is cryptographically aligned with the host device in an aligned state 820. The aligned state 820 may be a specific description of other aligned states described herein such as the aligned state 120 of FIG. 1, for example.

A host device public key $P_{HD}$ may optionally be created from the host device private key $n_{HD}$ prior to the aligned state 820. The host device public key $P_{HD}$ may be an ECC public key of the ($n_{HD}$, $P_{HD}$) ECDH key pair, for example. In some embodiments, the host device private key $n_{HD}$ and the host device public key $P_{HD}$ may be a static key pair that is reused for more than one host device. That is, in this specific scenario, both the host device private key $n_{HD}$ and the host device public key $P_{HD}$ may be kept secret and the host device public key $P_{HD}$ may be public only in the sense that it is made known to the secure element. Optionally, the host device public key $P_{HD}$ is securely transported from a host device manufacturing location to a secure element manufacturing location in step 806. Also prior to the aligned state 820, host key information $HK_{SE}$ may be stored in a secure element host key slot (SE-$HK_{SE}$ slot) of the secure element in step 802. The host key information may be generated using the secure element private key $n_{SE}$ and the host device public key $P_{HD}$.

It should also be noted that, prior to the aligned state 820, signed certificates may be installed in the secure element and/or the host device. For example, an $HSM_{SE}$ may create a secure element certificate $C_{SE}$ using a certificate authority (CA) signing-private-key and install the secure element certificate $C_{SE}$ in the secure element prior to the aligned state 820. Additionally or alternatively, an $HSM_{HD}$ may create a host device certificate $C_{HD}$ using a CA signing-private-key and install the host device certificate $C_{HD}$ in the host device prior to the aligned state 820. These certificates may be used, for example, during the binding process to allow the host device to verify it is pairing with an authorized secure element, and for the secure element to verify it is being paired with an authorized host device.

FIG. 9 illustrates a method of cryptographically binding a secure element to a host device using a secure element public key and a host device private key in accordance with an embodiment of the invention. The method of FIG. 9 may be a specific implementation of other methods described herein, such as the cryptographic binding method 200 of FIG. 2, for example. Similarly labeled elements may be as previously described.

Referring to FIG. 9, a cryptographic binding method 900 includes an initial state which is an aligned state 820 in which a secure element and a host device are cryptographically aligned. The alignment may be performed in accordance with cryptographic alignment methods as describe herein, such as the cryptographic alignment method 800 of FIG. 8, for example. The alignment process may be geographically separated from a binding location where the cryptographic binding method 900 is performed and at which the secure element and the host device are collocated. For example, the binding location may be a chipset manufacturing location that is remote to locations such as a secure element manufacturing location and a host device manufacturing location.

After the aligned state 820, the secure element is operationally coupled to the host device in step 210 as previously described. The binding process may optionally be initiated by sending a predetermined command to the host device in step 211 and the secure element may optionally be unlocked by a password in step 212, also as previously described. After step 210, a secure element public key $P_{SE}$ is optionally created using a secure element private key $n_{SE}$ in step 903 if it has not already been created prior to the aligned state 820. For example, the secure element may create the secure element public key $P_{SE}$ internally. After the secure element contains the secure element public key $P_{SE}$, the host device reads the secure element public key $P_{SE}$ from the secure element in step 915.

The host device creates host key information $HK_{SE}$ using a host device private key $n_{HD}$ and the secure element public key $P_{SE}$ in step 917. After the host key information $HK_{SE}$ is generated by the host device in step 917, the host device stores the host key information $HK_{SE}$ in a host device host key information slot (HD-$HK_{SE}$ slot) of the host device in step 918. If the host key information $HK_{SE}$ is not stored in the secure element prior to the aligned state 820, the host key information $HK_{SE}$ is optionally created using the secure element private key $n_{SE}$ and a host device public key $P_{HD}$ in step 913. Similar to step 917, the host device public key $P_{HD}$ may be created by the host device using the host device private key $n_{HD}$. The host device public key $P_{HD}$ may be sent to the secure element by the host device as part of the binding process after step 210, but before step 913.

After the host key information is created by the secure element in step 913, the host key information $HK_{SE}$ is stored in a secure element host key information slot (SE-$HK_{SE}$ slot) of the secure element in step 914. Once the host key information $HK_{SE}$ is stored in both the HD-$HK_{SE}$ slot of the host device in step 918 and in the SE-$HK_{SE}$ slot of the secure element either prior to the aligned state 820 or in step 914, the secure element is cryptographically bound to the host device in bound state 30, which may be as previously described.

In some embodiments, signed certificates may be used during the binding process to verify that the public keys sent between the host device and the secure element are valid. For example, a secure element certificate $C_{SE}$ may be signed by an $HSM_{SE}$ and stored in the secure element prior to the aligned state 820. Then, the host device may verify that the secure element public key $P_{SE}$ is valid (i.e. sent by a legitimate secure element) in step 915 by verifying the secure element certificate $C_{SE}$ using a certificate authority (CA) public key that corresponds to the secure element (e.g. the CA signing-private-key used be the $HSM_{SE}$ to create the secure element certificate $C_{SE}$). Similarly, in embodiments where the secure element creates the host key information $HK_{SE}$ after the aligned state 820 (e.g. in step 913) a host device certificate $C_{HD}$ may be signed by an $HSM_{HD}$ and stored in the host device prior to the aligned state 820. The secure element may then verify that the host device public key $P_{HD}$ is valid (i.e. sent by a legitimate host device) in step 913 by verifying the host device certificate $C_{HD}$ using a CA public key that corresponds to the host device (e.g. the CA signing-private-key used be the $HSM_{HD}$ to create the host device certificate $C_{HD}$). In other words, signed certificates may be used by the host device and/or the secure element to verify that the device with which it is engaging is authorized to be bound to it.

Figure 10:
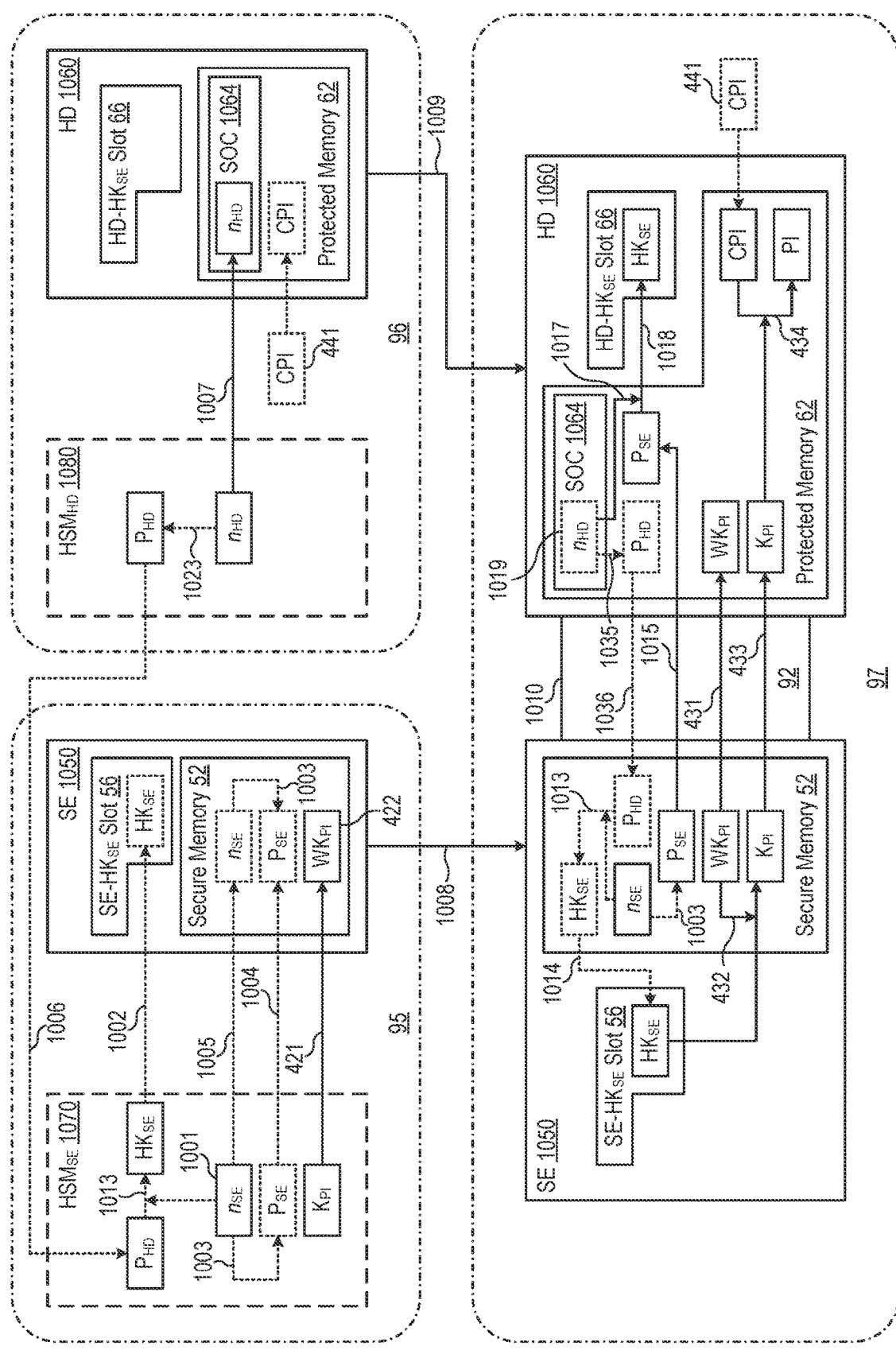
FIG. 10 illustrates schematic block diagrams of a secure element, host device, and hardware security modules usable for cryptographic alignment, binding, and secure acquisition of proprietary information using a secure element public key and a host device private key in accordance with an embodiment of the invention.

FIG. 10 illustrates schematic block diagrams of a secure element, host device, and hardware security modules usable for cryptographic alignment, binding, and secure acquisition of proprietary information using a secure element public key and a host device private key in accordance with an embodiment of the invention. The schematic block diagrams of FIG. 10 may schematically illustrate implementations of one or more of the methods described herein, such as the cryptographic alignment method 700, the cryptographic binding method 800, and the method of acquiring proprietary information 300 of FIGS. 7, 8, and 3 respectively, as examples. Further, the schematic block diagrams of FIG. 10 may be a specific implementation of other schematic block diagrams described herein, such as the schematic block diagrams of FIG. 4, for example. Similarly labeled elements may be as previously described.

Referring to FIG. 10, the schematic block diagrams include a secure element 1050 (SE 1050), a secure element hardware security module 1070 ($HSM_{SE}$ 1070), a host device 1060 (HD 1060), and a host device hardware security module 1080. The secure element 1050 may be a specific implementation of the secure element 450 of FIG. 4. In the same way, the host device 1060 may be a specific implementation of the host device 460 of FIG. 4.

Similar to other hardware security modules previously described, the $HSM_{SE}$ 1070 may optionally be included at the secure element manufacturing location 95 and the $HSM_{HD}$ 1080 may optionally be included at the host device manufacturing location 96. The $HSM_{SE}$ 1070 and the $HSM_{HD}$ 1080 may be specific implementations of the $HSM_{SE}$ 470 and the $HSM_{HD}$ 480 of FIG. 4, respectively.

A secure element private key $n_{SE}$ is generated in step 1001. The secure element private key $n_{SE}$ is either stored in secure memory 52 of the secure element 1050 in step 1005 or used to generate a secure element public key $P_{SE}$ in step 1003. If the secure element public key $P_{SE}$ is generated in step 1003, the secure element public key $P_{SE}$ is then stored in the secure memory 52 of the secure element 1050 in step 1004. Alternatively, after the secure element private key $n_{SE}$ is stored in the secure memory 52 in step 1005, the secure element 1050 may create the secure element public key $P_{SE}$ internally in step 1003 and then store the secure element public key $P_{SE}$ in the secure memory 52 in step 1004.

Optionally, a host device public key $P_{HD}$ may be used in combination with the secure element private key $n_{SE}$ to generate host key information $HK_{SE}$ in step 1013. If the host device public key $P_{HD}$ is not already located at the secure element manufacturing location 95 (e.g. in the $HSM_{SE}$ 1070) then host device public key $P_{HD}$ may be securely transported from a host device manufacturing location 96 to the secure element manufacturing location 95 in step 1006. The host key information $HK_{SE}$ may be generated by the $HSM_{SE}$ 1070. Then, the host key information $HK_{SE}$ may be optionally be stored in a secure element host key information slot 56 (SE-$HK_{SE}$ slot 56) of the secure element 1050 in step 1002. For example, the host key information $HK_{SE}$ may be securely installed in the SE-HK$_{SE}$ slot 56 of the secure element 1050 by the HSM$_{SE}$ 1070. A proprietary information key K$_{PI}$ is wrapped to form a wrapped proprietary information key WK$_{PI}$ in step 421. The wrapped proprietary information key WK$_{PI}$ is stored in the secure memory 52 of the secure element 1050 in step 422.

Still referring to FIG. 10, a host device private key n$_{HD}$ is stored in system operational code 1064 (SOC 1064) of the host device 1060 in step 1007. For example, the HSM$_{HD}$ 1080 may generate the host device private key n$_{HD}$. Alternatively, the host device private key n$_{HD}$ may be a static key known only to the HSM$_{HD}$ 1080. The host device public key P$_{HD}$ is optionally created using the host device private key n$_{HD}$ in step 1023 prior to step 1006. Encrypted proprietary information CPI may optionally be stored in protected memory 62 of the host device 1060 in step 441.

The secure element 1050 may be cryptographically bound to the host device 1060 at a chipset manufacturing location 97 which may be geographically separate from (i.e. remote to) both the secure element manufacturing location 95 and the host device manufacturing location 96. The secure element 1050 is transported from the secure element manufacturing location 95 to the chipset manufacturing location 97 in step 1008. Similarly, the host device 1060 is transported from the host device manufacturing location 96 to the chipset manufacturing location 97 in step 1009. At this point, the secure element 1050 and the host device 1060 are collocated at the chipset manufacturing location 97. That is, the secure element 1050 and the host device 1060 are physically in the same location.

The secure element 1050 is operatively coupled to the host device 1060 in step 1010. If the secure element 1050 does not have a secure element public key P$_{SE}$ prior to step 1010, the secure element 1050 creates the secure element public key P$_{SE}$ using the secure element private key n$_{SE}$ in step 1003. The host device 1060 reads the secure element public key P$_{SE}$ from the secure element 1050 in step 1015. The host device 1060 generates host key information HK$_{SE}$ using the host device private key n$_{HD}$ and the secure element public key P$_{SE}$ in step 1017 and stores the host key information HK$_{SE}$ in the HD-HK$_{SE}$ slot 66 of the host device 1060 in step 1018. After the host key information HK$_{SE}$ has been installed in the HD-HK$_{SE}$ slot 66 of the host device 1060, the host device private key n$_{HD}$ and the secure element public key P$_{SE}$ are optionally deleted in step 1019 to further protect the anonymity of the host key information HK$_{SE}$. For example the binding process stored in the system operational code 1064 may be atomic and delete all key material as soon as it is used.

If the host key information HK$_{SE}$ was not stored in the secure element 1050 prior to step 1010, the secure element 1050 may create the host key information using the secure element private key n$_{SE}$ and the host device public key P$_{HD}$ in step 1013 and store the host key information HK$_{SE}$ in the SE-HK$_{SE}$ slot 56 of the secure element 1050 in step 1014. The host device 1060 may create the host device public key P$_{HD}$ internally using the host device private key n$_{HD}$ in step 1035. The host device 1060 may send the host device public key P$_{HD}$ to the secure element 1050 in step 1036 at some time after step 1010.

Once the host key information HK$_{SE}$ is stored in both the SE-HK$_{SE}$ slot 56 and the HD-HK$_{SE}$ slot 66, the secure element 1050 and the host device 1060 are cryptographically bound. The host device 1060 uses the host key information HK$_{SE}$ stored in the HD-HK$_{SE}$ slot 66 to read the wrapped proprietary information key WK$_{PI}$ from the secure element 1050 in step 431 and instruct the secure element 1050 to unwrap the wrapped proprietary information key WK$_{PI}$ to generate the proprietary information key K$_{PI}$ in step 432. The proprietary information key K$_{PI}$ is then provided to the host device 1060 in step 433. In step 434, the host device 1060 uses the proprietary information key K$_{PI}$ to decrypt the encrypted proprietary information CPI and generate the proprietary information PI.

As previously noted, the methods and schematic diagrams of FIGS. 8-10 may be specific implementations of the methods and schematic diagrams of FIGS. 1-4. For example, the secure element public key P$_{SE}$ may be a specific implementation of the binding information B$_{SE}$. Additionally, the secure element private key n$_{SE}$ and the host device private key n$_{HD}$ may be specific implementations of the first secret key SK$_1$ and the second secret key SK$_2$ respectively.

Example embodiments of the invention are summarized here. Other embodiments can also be understood from the entirety of the specification as well as the claims filed herein.

Example 1. A method of cryptographically binding a secure element to a host device (HD), the method including: storing host key information HK$_{SE}$ in an SE-HK$_{SE}$ slot of the secure element; at a first location, storing binding information B$_{SE}$ in secure memory of the secure element, where the binding information B$_{SE}$ is cryptographically correlated with the host key information HK$_{SE}$; at a second location remote to the first location, storing a second secret key SK$_2$ within system operational code stored in protected memory of the host device, where the second secret key SK$_2$ is cryptographically correlated with the host key information HK$_{SE}$; and at a third location, after storing the binding information B$_{SE}$, and after storing the second secret key SK$_2$, operationally coupling the secure element to the host device, reading, by the host device, the binding information B$_{SE}$ from the secure element, generating, by the host device, the host key information HK$_{SE}$ using the binding information B$_{SE}$ and the second secret key SK$_2$, and storing, by the host device, the host key information HK$_{SE}$ in an HD-HK$_{SE}$ slot of the host device, where the secure element and the host device are collocated at the third location, and where the third location is remote to both the first location and the second location.

Example 2. The method of example 1, where: operationally coupling the secure element to the host device includes electrically coupling the secure element to the host device using a data bus; and reading the binding information B$_{SE}$ from the secure element includes transmitting the binding information B$_{SE}$ from the secure element to the host device through the data bus.

Example 3. The method of one of examples 1 and 2, further including: deleting, by the host device, the second secret key SK$_2$ after storing the host key information HK$_{SE}$ in the HD-HK$_{SE}$ slot.

Example 4. The method of one of examples 1 to 3, where: the binding information B$_{SE}$ includes encrypted host key information CHK$_{SE}$; the encrypted host key information CHK$_{SE}$ is encrypted using a symmetric-key cryptographic algorithm; and storing the host key information HK$_{SE}$ in the SE-HK$_{SE}$ slot of the secure element includes storing the host key information HK$_{SE}$ in the secure element at the first location.

Example 5. The method of one of examples 1 to 3, where: the binding information B$_{SE}$ is a secure element public key P$_{SE}$; the second secret key SK$_2$ is a host device private key n$_{HD}$; and generating the host key information HK$_{SE}$ includes creating, by the host device, the host key information HK$_{SE}$ using the secure element public key P$_{SE}$ and the host device private key n$_{HD}$.

Example 6. The method of one of examples 1 to 3, further including: at the first location, storing the first secret key $SK_1$ in the secure memory of the secure element, where the first secret key $SK_1$ is a secure element private key $n_{SE}$; at the third location and after operationally coupling the secure element to the host device sending, by the host device, a host device public key $P_{HD}$ to the secure element, and creating, by the secure element, the host key information $HK_{SE}$ using the host device public key $P_{HD}$ and the secure element private key $n_{SE}$; and where storing the host key information $HK_{SE}$ in the SE-$HK_{SE}$ slot of the secure element includes storing the host key information $HK_{SE}$ at the third location after creating the host key information $HK_{SE}$ using the host device public key $P_{HD}$ and the secure element private key $n_{SE}$.

Example 7. The method of one of examples 1 to 6, further including: generating, by a first hardware security module $HSM_{SE}$ at the first location, the first secret key $SK_1$; generating, by a second hardware security module $HSM_{HD}$ at the second location, the second secret key $SK_2$; and where steps performed at the third location are performed without using a hardware security module.

Example 8. The method of one of examples 1 to 7, further including: storing a secure-backup-data file in secure memory of the secure element, where the secure-backup-data file includes encrypted host key backup information usable to recover host devices for which the host key information $HK_{SE}$ stored in the HD-$HK_{SE}$ slot of the host device has become corrupted.

Example 9. The method of one of examples 1 to 8, further including: at the third location after operationally coupling the secure element and the host device and before reading the binding information $B_{SE}$, unlocking the secure element using a batch password.

Example 10. The method of one of examples 1 to 9, further including: at the first location after storing the host key information $HK_{SE}$ in the SE-$HK_{SE}$ slot of the secure element and before operationally coupling the secure element to the host device, wrapping a proprietary information key $K_{PI}$ to form a wrapped proprietary information key $WK_{PI}$, and storing the wrapped proprietary information key $WK_{PI}$ in the secure memory of the secure element; loading encrypted proprietary information into the host device; and at the third location after storing the host key information $HK_{SE}$ in the HD-$HK_{SE}$ slot of the host device, reading the wrapped proprietary information key $WK_{PI}$ from the secure element, instructing, by the host device using the host key information $HK_{SE}$ stored in the HD-$HK_{SE}$ slot of the host device, the secure element to unwrap the wrapped proprietary information key $WK_{PI}$ and provide the proprietary information key $K_{PI}$ to the host device, and decrypting the encrypted proprietary information using the proprietary information key $K_{PI}$.

Example 11. The method of one of examples 1 to 10, further including: at the first location and before operationally coupling the secure element to the host device, preinstalling a wrapped license key $K_1$ into the secure memory of the secure element, the wrapped license key $K_1$ corresponding to proprietary executable computer code; and at the third location and after storing the host key information $HK_{SE}$ in the HD-$HK_{SE}$ slot of the host device, using, by the host device, the secure element as a hardware license to verify permission to install the proprietary executable computer code by unwrapping the wrapped license key $K_1$ using the host key information $HK_{SE}$, and installing, by the host device, the proprietary executable computer code in the host device.

Example 12. The method of example 11, where the proprietary executable computer code is proprietary firmware.

Example 13. The method of example 11, further including: after using the secure element as the hardware license, decrementing a counter of the secure element, where the counter tracks a quantity of installations of the proprietary executable computer code, and where the secure element is configured to disallow installation of the proprietary executable computer code when the counter is equal to zero.

Example 14. A method of cryptographically aligning a secure element with a host device, the method including: generating a secure element-diversified key $K_{SE}$ as a function of a master key $K_M$ and a secure element unique identifier $UID_{SE}$; encrypting host key information $HK_{SE}$ using the secure element-diversified key $K_{SE}$ to generate encrypted host key information $CHK_{SE}$, where the host key information $HK_{SE}$ uniquely corresponds to the secure element; storing the host key information $HK_{SE}$ in a SE-$HK_{SE}$ slot of the secure element; storing the encrypted host key information $CHK_{SE}$ in secure memory of the secure element; and obfuscating the master key $K_M$ using a host device unique identifier $UID_{HD}$ to generate a host device-obfuscated key $K_{HD}$ within system operational code stored in protected memory of the host device.

Example 15. The method of example 14, where the host key information $HK_{SE}$ includes a host message authentication code (MAC) key and a host cipher key.

Example 16. The method of one of examples 14 and 15, where the secure element-diversified key $K_{SE}$ is an advanced encryption standard (AES) key.

Example 17. The method of one of examples 14 to 16, where: generating the secure element-diversified key $K_{SE}$ further includes generating the secure element-diversified key $K_{SE}$ as a function of the master key $K_M$, the secure element unique identifier $UID_{SE}$, and a batch password; and obfuscating the master key $K_M$ further includes obfuscating the master key $K_M$ using the host device unique identifier $UID_{HD}$ and the batch password.

Example 18. The method of one of examples 14 to 17, further including: operationally coupling the secure element to the host device; and executing the system operational code by the host device, where executing the system operational code includes reading the encrypted host key information $CHK_{SE}$ and the secure element unique identifier $UID_{SE}$ from the secure element, reversing obfuscation of the host device-obfuscated key $K_{HD}$ to generate the master key $K_M$, decrypting the encrypted host key information $CHK_{SE}$ using the master key $K_M$ and the secure element unique identifier $UID_{SE}$ to generate the host key information $HK_{SE}$, and storing the host key information $HK_{SE}$ in an HD-$HK_{SE}$ slot of the host device.

Example 19. The method of example 18, further including: after storing the host key information $HK_{SE}$ in the HD-$HK_{SE}$ slot of the secure element and before executing the system operational code, instructing the secure element to wrap a proprietary information key $K_{PI}$ to form a wrapped proprietary information key $WK_{PI}$, and store the wrapped proprietary information key $WK_{PI}$ in the secure memory of the secure element; sending encrypted proprietary information to the host device; and where executing the system operational code further includes reading the wrapped proprietary information key $WK_{PI}$ from the secure element, using the host key information $HK_{SE}$ stored in the HD-$HK_{SE}$ slot of the host device, instructing the secure element to e the wrapped proprietary information key $WK_{PI}$ and provide the proprietary information key $K_{PI}$ to the host device, and decrypting the encrypted proprietary information using the proprietary information key KIM Example 20. The method of example 19, where the encrypted proprietary information includes firmware to be installed on the host device.

Example 21. The method of one of examples 18 and 19, further including: before executing the system operational code, sending an initiate command to the host device triggering boot-up of the system operational code, where the initiate command includes a batch password; and where executing the system operational code further includes unlocking the secure element using the batch password.

Example 22. The method of one of examples 18 to 21, further including: after storing the host key information $HK_{SE}$ in the HD-$HK_{SE}$ slot of the host device, deleting the master key $K_M$ and the host device-obfuscated key $K_{HD}$ from the host device.

Example 23. A method of cryptographically binding a secure element to a host device, the method including: storing a secure element private key $n_{SE}$ in secure memory of the secure element; creating a secure element public key $P_{SE}$ using the secure element private key $n_{SE}$; storing a host device private key $n_{HD}$ within system operational code stored in protected memory of the host device; operationally coupling the secure element and the host device; and executing the system operational code by the host device, where executing the system operational code includes reading the secure element public key $P_{SE}$ from the secure element, creating host key information $HK_{SE}$ using the host device private key $n_{HD}$ and the secure element public key $P_{SE}$, and storing the host key information $HK_{SE}$ in a HD-$HK_{SE}$ slot of the host device.

Example 24. The method of example 23, further including: before operationally coupling the secure element to the host device, creating a host device public key $P_{HD}$ using the host device private key $n_{HD}$, creating the host key information $HK_{SE}$ using the secure element private key $n_{SE}$ and the host device private key $n_{HD}$, and storing the host key information $HK_{SE}$ in a SE-$HK_{SE}$ slot of the secure element.

Example 25. The method of example 24, where creating the host device public key $P_{HD}$ and creating the host key information $HK_{SE}$ using the secure element private key $n_{SE}$ and the host device private key $n_{HD}$ are performed by a hardware security module $HSM_{SE}$.

Example 26. The method of one of examples 23 to 25, further including: where executing the system operational code further includes creating a host device public key $P_{HD}$ using the host device private key $n_{HD}$, and sending the host device public key $P_{HD}$ to the secure element; creating, by the secure element, the host key information $HK_{SE}$ using the secure element private key $n_{SE}$ and the host device public key $P_{HD}$; and storing, by the secure element, the host key information $HK_{SE}$ in a SE-$HK_{SE}$ slot of the secure element.

Example 27. The method of one of examples 23 to 26, further including: after storing the host key information $HK_{SE}$ in the HD-$HK_{SE}$ slot of the host device, deleting the host device private key $n_{HD}$ from the host device.

Example 28. The method of one of examples 23 to 27, where: the secure element private key $n_{SE}$ and the secure element public key $P_{SE}$ are a first elliptic-curve Diffie-Hellman (ECDH) key pair generated according to a predetermined set of elliptic-curve cryptography (ECC) parameters.

Example 29. The method of example 28, further including: creating a host device public key $P_{HD}$ using the host device private key $n_{HD}$, where the host device private key $n_{HD}$ and the host device public key $P_{HD}$ are a second ECDH key pair generated according to the predetermined set of ECC parameters; creating, by the secure element, the host key information $HK_{SE}$ using the secure element private key $n_{SE}$ and the host device public key $P_{HD}$; and storing, by the secure element, the host key information $HK_{SE}$ in a SE-$HK_{SE}$ slot of the secure element.

Example 30. The method of example 28, where the predetermined set of ECC parameters defines a prime curve over $Z_p$.

Example 31. The method of example 28, where the predetermined set of ECC parameters defines a binary curve over $GF(2^m)$.

Example 32. The method of one of examples 23 to 31, further including: generating, by a secure element hardware security module, a secure element certificate; storing the secure element certificate in the secure element; generating, by a host device hardware security module, a host device certificate; storing the host device certificate in the host device; and after operationally coupling the secure element and the host device, verifying, by the host device, that the secure element is authorized to pair with the host device by validating the secure element certificate using a secure element public key, and verifying, by the secure element, that the host device is authorized to pair with the secure element by validating the host device certificate using a host device public key.

Example 33. The method of one of examples 23 to 32, further including: generating the secure element private key $n_{SE}$ as a function of a secure element unique identifier $UID_{SE}$.

Example 34. The method of one of examples 23 to 33, further including: generating the host device private key $n_{HD}$ as a function of a host device unique identifier $UID_{HD}$.

Example 35. The method of one of examples 23 to 34, further including: before executing the system operational code, sending an initiate command to the host device triggering boot-up of the system operational code, where the initiate command includes a batch password; and where executing the system operational code further includes unlocking the secure element using the batch password.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, one or more of the embodiments of FIGS. 1-10 may be combined in further embodiments. It is therefore intended that the appended claims encompass any such modifications or embodiments.

What is claimed is:

1. A secure element (SE) device configured to be cryptographically bound to a host device (HD), the secure element device comprising:
    an SE-$HK_{SE}$ slot configured to store host key information $HK_{SE}$ allowing only the host device to control the secure element, the host key information $HK_{SE}$ being cryptographic information certified at a secure location prior to an initialization process of the secure element device;
    a secure memory comprising prevention measures impeding unauthorized entities from obtaining information from the secure memory, the secure memory storing binding information $B_{SE}$ that is cryptographically correlated with the host key information $HK_{SE}$;
    limited functionality allowing the binding information $B_{SE}$ to be read from the secure memory by the host device during a binding process, the host device generating the host key information $HK_{SE}$ using the binding information $B_{SE}$ read from the secure element and a second secret key $SK_2$; and general functionality only accessible to the host device using the generated host key information $HK_{SE}$.

2. The secure element device of claim 1, wherein the secure element device is configured to store the binding information $B_{SE}$ during the initialization process prior to and geographically remote from the binding process.

3. The secure element device of claim 2, wherein the secure element device is further configured to receive both the host key information $HK_{SE}$ and the binding information $B_{SE}$ from a hardware security module during the initialization process, the hardware security module providing a certificate basis for the host key information $HK_{SE}$.

4. The secure element device of claim 2, wherein the secure element device is further configured to receive a first secret key $SK_1$ generated by a hardware security module during the initialization process and store the first secret key $SK_1$ in the secure memory, the hardware security module providing a certificate basis for the host key information $HK_{SE}$.

5. The secure element device of claim 4, wherein the secure element device is further configured to generate the host key information $HK_{SE}$ using the first secret key SK, and store the host key information $HK_{SE}$ in the SE-$HK_{SE}$ slot during the binding process.

6. A secure system comprising the secure element of claim 1, and further comprising:
the host device (HD) comprising
protected memory configured to be protected from readout and modification,
system operational code stored in the protected memory and comprising a secret key SK, the system operational code being configured to read the binding information $B_{SE}$ during the binding process, and
an HD-$HK_{SE}$ slot configured to store the host key information $HK_{SE}$ cryptographically binding the host device and the secure element, the host key information $HK_{SE}$ being generated by the host device using the binding information $B_{SE}$ and the secret key SK.

7. The secure system of claim 6, wherein:
the binding information $B_{SE}$ is a secure element public key $P_{SE}$ generated using a secure element private key $n_{SE}$;
the secret key SK is a host device private key $n_{HD}$ used to generate a host device public key $P_{HD}$; and
the host key information $HK_{SE}$ stored in the SE-$HK_{SE}$ slot of the secure element is generated using the secure element private key $n_{SE}$ and the host device public key $P_{HD}$.

8. The secure system of claim 7, wherein the host key information $HK_{SE}$ stored in the SE-$HK_{SE}$ slot of the secure element is generated during an initialization process prior to and geographically remote from the binding process.

9. The secure system of claim 7, wherein the host key information $HK_{SE}$ stored in the SE-$HK_{SE}$ slot of the secure element is generated during the binding process.

10. The secure element device of claim 1, wherein:
the binding information $B_{SE}$ is encrypted host key information $CHK_{SE}$ encrypted using the host key information $HK_{SE}$ and a secure element-diversified key $K_{SE}$, the secure element-diversified key $K_{SE}$ being generated at the secure location prior to the initialization process as a function of a master key $K_M$ and a secure element unique identifier $UID_{SE}$ unique to the secure element device; and
the second secret key $SK_2$ is also generated as a function of the master key $K_M$.

11. A secure element (SE) device configured to be cryptographically bound to a host device (HD), the secure element device comprising:
an SE-$HK_{SE}$ slot configured to store host key information $HK_{SE}$ allowing only the host device to control the secure element;
a secure memory comprising prevention measures impeding unauthorized entities from obtaining information from the secure memory, the secure memory storing binding information $B_{SE}$ that is cryptographically correlated with the host key information $HK_{SE}$;
limited functionality allowing the binding information $B_{SE}$ to be read from the secure memory by the host device during a binding process, the host device generating the host key information $HK_{SE}$ using the binding information $B_{SE}$ read from the secure element and a second secret key $SK_2$; and
general functionality only accessible to the host device using the generated host key information $HK_{SE}$, wherein:
a wrapped license key WK corresponding to proprietary executable computer code is stored in the secure memory prior to and geographically remote from the binding process; and
the general functionality includes an instruction to unwrap the wrapped license key WK to generate a license key K so that the secure element device is used as a hardware license for the proprietary executable computer code.

12. The secure element device of claim 11, further comprising:
a counter configured to decrement after the secure element device is used as the hardware license, the secure element device being configured to disallow installation of the proprietary executable computer code when the counter is equal to zero.

13. A host device (HD) configured to be cryptographically bound to a secure element (SE), the host device comprising:
protected memory configured to be protected from readout and modification;
system operational code stored in the protected memory and comprising a second secret key $SK_2$, the system operational code being configured to
read binding information $B_{SE}$ during a binding process, and
generate host key information $HK_{SE}$ during the binding process using the binding information $B_{SE}$ and the second secret key $SK_2$, the host key information $HK_{SE}$ being cryptographic information certified at a secure location prior to an initialization process of the host device and allowing only the host device to control the secure element; and
an HD-$HK_{SE}$ slot configured to store the host key information $HK_{SE}$.

14. The host device of claim 13, wherein the host device is configured to have the second secret key $SK_2$ installed in the system operational code during the initialization process prior to and geographically remote from the binding process.

15. The host device of claim 13, wherein:
the second secret key $SK_2$ is a host device-obfuscated key $K_{HD}$ generated at the secure location prior to the initialization process by obfuscating a master key $K_M$ using a host device unique identifier $UID_{HD}$ unique to the host device; and the binding information $B_{SE}$ is also generated as a function of the master key $K_M$.

16. A host device (HD) configured to be cryptographically bound to a secure element (SE), the host device comprising:

protected memory configured to be protected from read-out and modification;

system operational code stored in the protected memory and comprising a second secret key $SK_2$, the system operational code being configured to read binding information $B_{SE}$ during a binding process, and generate host key information $HK_{SE}$ during the binding process using the binding information $B_{SE}$ and the second secret key $SK_2$, the host key information $HK_{SE}$ allowing only the host device to control the secure element; and an HD-$HK_{SE}$ slot configured to store the host key information $HK_{SE}$, wherein the host device is further configured to store encrypted proprietary information CPI, instruct the secure element, using the host key information $HK_{SE}$ generated during the binding process, to provide a proprietary information key $K_{PI}$ to the host device, and decrypt the encrypted proprietary information CPI to generate proprietary information PI using the proprietary information key $K_{PI}$.

17. The host device of claim 16, wherein the encrypted proprietary information CPI is received by the host device during an initialization process prior to and geographically remote from the binding process.

18. The host device of claim 16, wherein the encrypted proprietary information CPI is received by the host device during the binding process.

19. The host device of claim 16, wherein the encrypted proprietary information CPI is stored in the protected memory.

20. The host device of claim 16, wherein the proprietary information PI is proprietary executable computer code that is installed on the host device using the secure element as a hardware license.

* * * * *